(12) United States Patent
Seiger et al.

(10) Patent No.: US 10,148,918 B1
(45) Date of Patent: Dec. 4, 2018

(54) MODULAR SHELVING SYSTEMS FOR PACKAGE TRACKING

(71) Applicant: Position Imaging, Inc., Portsmouth, NH (US)

(72) Inventors: Alex Seiger, Concord, NH (US); Shahzad Farooq Kirmani, Scarborough, ME (US); Edward L. Hill, Exeter, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 69 days.

(21) Appl. No.: 15/270,749

(22) Filed: Sep. 20, 2016

Related U.S. Application Data

(63) Continuation-in-part of application No. 15/091,180, filed on Apr. 5, 2016.

(60) Provisional application No. 62/221,855, filed on Sep. 22, 2015, provisional application No. 62/143,332, filed on Apr. 6, 2015.

(51) Int. Cl.
| | | |
|---|---|---|
| *H04N 7/18* | (2006.01) | |
| *A47B 47/00* | (2006.01) | |
| *G06Q 10/08* | (2012.01) | |
| *H04N 5/225* | (2006.01) | |

(52) U.S. Cl.
CPC ......... *H04N 7/183* (2013.01); *A47B 47/0091* (2013.01); *G06Q 10/087* (2013.01); *H04N 5/2251* (2013.01); *H04N 5/2256* (2013.01)

(58) Field of Classification Search
CPC .... H04N 5/2251; H04N 5/2256; H04N 7/183; A47B 47/0091; G06Q 10/087
See application file for complete search history.

(56) References Cited

U.S. PATENT DOCUMENTS

| | | |
|---|---|---|
| 3,824,596 A | 7/1974 | Guion et al. |
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | Mcewan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |

(Continued)

OTHER PUBLICATIONS

Farrell & Barth, "The Global Positiong System & Interial Navigation", 1999, McGraw-Hill; pp. 245-252.

(Continued)

*Primary Examiner* — Huy T Nguyen
(74) *Attorney, Agent, or Firm* — Schmeiser, Olsen & Watts LLP

(57) ABSTRACT

A shelving system has at least one shelf, a camera fixed at a distance from the at least one shelf such that a field of view of the camera faces the at least one shelf and closely encompasses the at least one shelf, and a controller in communication with the camera. The controller has a processor adapted to receive images captured by the camera within the camera's field of view and to determine from the images whether a particular object has been placed on, moved, or removed from the at least one shelf.

22 Claims, 14 Drawing Sheets

(56) References Cited

U.S. PATENT DOCUMENTS

| | | | |
|---|---|---|---|
| 6,167,347 A | 12/2000 | Lin | |
| 6,255,991 B1 | 7/2001 | Hedin | |
| 6,292,750 B1 | 9/2001 | Lin | |
| 6,409,687 B1 | 6/2002 | Foxlin | |
| 6,417,802 B1 | 7/2002 | Diesel | |
| 6,496,778 B1 | 12/2002 | Lin | |
| 6,512,748 B1 | 1/2003 | Mizuki et al. | |
| 6,593,885 B2 | 7/2003 | Wisherd et al. | |
| 6,630,904 B2 | 10/2003 | Gustafson et al. | |
| 6,634,804 B1* | 10/2003 | Toste | F16M 11/10 396/427 |
| 6,683,568 B1 | 1/2004 | James et al. | |
| 6,697,736 B2 | 2/2004 | Lin | |
| 6,721,657 B2 | 4/2004 | Ford et al. | |
| 6,750,816 B1 | 6/2004 | Kunysz | |
| 6,861,982 B2 | 3/2005 | Forstrom | |
| 6,989,789 B2 | 1/2006 | Ferreol et al. | |
| 7,009,561 B2 | 3/2006 | Menache | |
| 7,143,004 B2 | 11/2006 | Townsend et al. | |
| 7,168,618 B2 | 1/2007 | Schwartz | |
| 7,190,309 B2 | 3/2007 | Hill | |
| 7,193,559 B2 | 3/2007 | Ford et al. | |
| 7,236,091 B2 | 6/2007 | Kiang et al. | |
| 7,292,189 B2 | 11/2007 | Orr et al. | |
| 7,295,925 B2 | 11/2007 | Breed et al. | |
| 7,409,290 B2 | 8/2008 | Lin | |
| 7,443,342 B2 | 10/2008 | Shirai et al. | |
| 7,499,711 B2 | 3/2009 | Hoctor et al. | |
| 7,533,569 B2 | 5/2009 | Sheynblat | |
| 7,612,715 B2 | 11/2009 | Macleod | |
| 7,646,330 B2 | 1/2010 | Karr | |
| 7,844,507 B2 | 11/2010 | Levy | |
| 7,876,268 B2 | 1/2011 | Jacobs | |
| 8,189,855 B2 | 5/2012 | Opalach et al. | |
| 8,269,624 B2 | 9/2012 | Chen et al. | |
| 8,406,470 B2 | 3/2013 | Jones et al. | |
| 8,457,655 B2 | 6/2013 | Zhang et al. | |
| 8,749,433 B2 | 6/2014 | Hill | |
| 8,957,812 B1 | 2/2015 | Hill et al. | |
| 9,063,215 B2 | 6/2015 | Perthold et al. | |
| 9,120,621 B1 | 9/2015 | Curlander | |
| 9,269,022 B2 | 2/2016 | Rhoads et al. | |
| 9,349,076 B1 | 5/2016 | Liu et al. | |
| 9,424,493 B2 | 8/2016 | He et al. | |
| 9,482,741 B1 | 11/2016 | Min | |
| 9,497,728 B2 | 11/2016 | Hill | |
| 9,514,389 B1 | 12/2016 | Erhan et al. | |
| 9,519,344 B1 | 12/2016 | Hill | |
| 9,782,669 B1 | 10/2017 | Hill | |
| 9,904,867 B2 | 2/2018 | Fathi et al. | |
| 9,933,509 B2 | 4/2018 | Hill et al. | |
| 9,961,503 B2 | 5/2018 | Hill | |
| 9,996,818 B1 | 6/2018 | Ren et al. | |
| 2002/0021277 A1 | 2/2002 | Kramer | |
| 2002/0140745 A1 | 10/2002 | Ellenby et al. | |
| 2003/0053492 A1 | 3/2003 | Matsunaga | |
| 2003/0120425 A1 | 6/2003 | Stanley et al. | |
| 2003/0195017 A1 | 10/2003 | Chen et al. | |
| 2004/0095907 A1 | 5/2004 | Agee et al. | |
| 2004/0176102 A1 | 9/2004 | Lawrence et al. | |
| 2004/0203846 A1 | 10/2004 | Caronni et al. | |
| 2005/0143916 A1 | 6/2005 | Kim et al. | |
| 2005/0184907 A1 | 8/2005 | Hall | |
| 2005/0275626 A1 | 12/2005 | Mueller et al. | |
| 2006/0013070 A1 | 1/2006 | Holm et al. | |
| 2006/0061469 A1 | 3/2006 | Jaeger et al. | |
| 2006/0066485 A1 | 3/2006 | Min | |
| 2006/0101497 A1 | 5/2006 | Hirt | |
| 2006/0279459 A1 | 12/2006 | Akiyama et al. | |
| 2007/0060384 A1 | 3/2007 | Dhota | |
| 2007/0138270 A1 | 6/2007 | Reblin | |
| 2008/0048913 A1 | 2/2008 | Macias et al. | |
| 2008/0154691 A1 | 6/2008 | Wellman et al. | |
| 2008/0204322 A1 | 8/2008 | Oswald et al. | |
| 2008/0316324 A1 | 12/2008 | Rofougaran | |
| 2009/0149202 A1 | 6/2009 | Hill et al. | |
| 2009/0243932 A1 | 10/2009 | Moshfeghi | |
| 2010/0090852 A1 | 4/2010 | Eitan | |
| 2010/0103173 A1 | 4/2010 | Lee | |
| 2010/0103989 A1 | 4/2010 | Smith et al. | |
| 2010/0123664 A1 | 5/2010 | Shin | |
| 2011/0006774 A1 | 1/2011 | Baiden | |
| 2011/0037573 A1 | 2/2011 | Choi | |
| 2011/0187600 A1 | 8/2011 | Landt | |
| 2011/0208481 A1 | 8/2011 | Slastion | |
| 2011/0210843 A1 | 9/2011 | Kummetz | |
| 2011/0241942 A1 | 10/2011 | Hill | |
| 2011/0256882 A1 | 10/2011 | Markhowsky et al. | |
| 2012/0013509 A1 | 1/2012 | Wisherd et al. | |
| 2012/0127088 A1 | 5/2012 | Pance et al. | |
| 2012/0319822 A1 | 12/2012 | Hansen | |
| 2013/0021417 A1 | 1/2013 | Ota et al. | |
| 2013/0036043 A1 | 2/2013 | Faith | |
| 2013/0314210 A1 | 11/2013 | Schoner | |
| 2013/0335318 A1 | 12/2013 | Nagel et al. | |
| 2014/0253368 A1 | 9/2014 | Holder | |
| 2014/0300516 A1 | 10/2014 | Min et al. | |
| 2014/0361078 A1 | 12/2014 | Davidson | |
| 2015/0009949 A1 | 1/2015 | Khoryaev et al. | |
| 2015/0012396 A1 | 1/2015 | Puerini et al. | |
| 2015/0019391 A1 | 1/2015 | Kumar et al. | |
| 2015/0029339 A1* | 1/2015 | Kobres | H04N 7/181 348/150 |
| 2015/0039458 A1 | 2/2015 | Reid | |
| 2015/0055821 A1 | 2/2015 | Fotland | |
| 2015/0085096 A1* | 3/2015 | Smits | G02B 23/02 348/78 |
| 2015/0091757 A1 | 4/2015 | Shaw et al. | |
| 2015/0169916 A1 | 6/2015 | Hill et al. | |
| 2015/0170002 A1 | 6/2015 | Szegedy et al. | |
| 2015/0221135 A1 | 8/2015 | Hill et al. | |
| 2015/0248765 A1 | 9/2015 | Criminisi et al. | |
| 2015/0323643 A1 | 11/2015 | Hill et al. | |
| 2015/0362581 A1 | 12/2015 | Friedman et al. | |
| 2015/0371319 A1 | 12/2015 | Argue et al. | |
| 2015/0379366 A1 | 12/2015 | Nomura et al. | |
| 2016/0035078 A1 | 2/2016 | Lin et al. | |
| 2016/0063610 A1 | 3/2016 | Argue et al. | |
| 2016/0098679 A1 | 4/2016 | Levy | |
| 2016/0140436 A1 | 5/2016 | Yin et al. | |
| 2016/0142868 A1 | 5/2016 | Kulkarni et al. | |
| 2016/0156409 A1 | 6/2016 | Chang | |
| 2016/0178727 A1 | 6/2016 | Bottazzi | |
| 2016/0238692 A1 | 8/2016 | Hill et al. | |
| 2016/0256100 A1 | 9/2016 | Jacofsky et al. | |
| 2016/0286508 A1 | 9/2016 | Khoryaev et al. | |
| 2016/0366561 A1 | 12/2016 | Min et al. | |
| 2016/0370453 A1 | 12/2016 | Boker et al. | |
| 2016/0371574 A1 | 12/2016 | Nguyen et al. | |
| 2017/0030997 A1 | 2/2017 | Hill et al. | |
| 2017/0031432 A1 | 2/2017 | Hill | |
| 2017/0234979 A1 | 8/2017 | Mathews et al. | |
| 2017/0293885 A1 | 10/2017 | Grady et al. | |
| 2017/0323174 A1 | 11/2017 | Joshi et al. | |
| 2017/0323376 A1 | 11/2017 | Glaser et al. | |
| 2017/0350961 A1 | 12/2017 | Hill et al. | |
| 2017/0372524 A1 | 12/2017 | Hill | |
| 2018/0068266 A1 | 3/2018 | Kirmani et al. | |

OTHER PUBLICATIONS

Grewal & Andrews, "Global Positioning Systems, Inertial Nagivation, and Integration", 2001, John Weiley and Sons, pp. 252-256.

Jianchen Gao, "Development of a Precise GPS/INS/On-Board Vehicle Sensors Integrated Vehicular Positioning System", Jun. 2007, UCGE Reports No. 20555; 245 pages.

Yong Yang, "Tightly Coupled MEMS INS/GPS Integration with INS Aided Receiver Tracking Loops", Jun. 2008, UCGE Reports No. 20270; 205 pages.

Goodall, Christopher L., "Improving Usability of Low-Cost INS/GPS Navigation Systems using Intelligent Techniques", Jan. 2009, UCGE Reports No. 20276; 234 pages.

(56) References Cited

OTHER PUBLICATIONS

Debo Sun, "Ultra-Tight GPS/Reduced IMU for Land Vehicle Navigation", Mar. 2010, UCGE Reports No. 20305; 254 pages.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.
Schmidt & Phillips, "INS/GPS Integration Architectures", NATO RTO Lecture Series, First Presented Oct. 20-21, 2003; 24 pages.
Adrian Schumacher, "Integration of a GPS aised Strapdown Inertial Navigation System for Land Vehicles", Master of Science Thesis, KTH Electrical Engineering, 2006; 67 pages.
Vikas Numar N., "Integration of Inertial Navigation System and Global Positioning System Using Kalman Filtering", M. Tech Dissertation, Indian Institute of Technology, Bombay, Mumbai, Jul. 2004; 69 pages.
Jennifer Denise Gautier, "GPS/INS Generalized Evaluation Tool (GIGET) for the Design and Testing of Integrated Navigation Systems", Dissertation, Stanford University, Jun. 2003; 160 pages.
Farrell, et al., "Real-Time Differential Carrier Phase GPS=Aided INS", Jul. 2000, IEEE Transactions on Control Systems Technology, vol. 8, No. 4; 13 pages.
Filho, et al., "Integrated GPS/INS Navigation System Based on a Gyrpscope-Free IMU", DINCON Brazilian Conference on Synamics, Control, and Their Applications, May 22-26, 2006; 6 pages.
Santiago Alban, "Design and Performance of a Robust GPS/INS Attitude System for Automobile Applications", Dissertation, Stanford University, Jun. 2004; 218 pages.
Proakis, John G. and Masoud Salehi, "Communication Systems Engineering", Second Edition, Prentice-Hall, Inc., Upper Saddle River, New Jersey, 2002; 815 pages.
Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.
International Search Report & Written Opinion in international patent application PCT/US12/64860, dated Feb. 28, 2013; 8 pages.
U.S. Appl. No. 13/293,639, filed Nov. 10, 2011, entitled "Position Tracking System and Method Using Radio Signals and Inertial Sensing"; 26 pages.
U.S. Appl. No. 13/975,637, filed Aug. 26, 2013, entitled "Radio Frequency Communication System," 22 pages.
Szeliski, R., "Image Alignment and Stitching: A Tutorial", Technical Report, MST-TR-2004-92, Dec. 10, 2006.
Brown et al., "Automatic Panoramic Image Stitching Using Invariant Features", International Journal of Computer Vision, vol. 74, No. 1, pp. 59-73, 2007.
Xu et al., "Performance Evaluation of Color Correction Approaches for Automatic Multi-view Image and Video Stitching", International Converence on Computer Vision and Pattern Recognition (CVPR10), San Francisco, CA, 2010.
"ADXL202/ADXL210 Product Sheet," Analog Devices, Inc., Analog.com, 1999; 11 pages.
U.S. Appl. No. 13/918,295, filed Jun. 14, 2013, entitled, "RF Tracking with Active Sensory Feedback"; 31 pages.
U.S. Appl. No. 13/975,724, filed Aug. 26, 2013, entitled, "Radio Frequency Communication System'" 22 pages.
Li, et al. "Multifrequency-Based Range Estimation of RFID Tags," IEEE International Conference on RFID, 2009.
Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.
Min, et al. "Systems and Methods of Wireless Position Tracking" U.S. Appl. No. 15/953,798, filed Apr. 16, 2018.
Hill, Edward L. "Wireless Relay Station for Radio Frequency-Based Tracking System" U.S. Appl. No. 15/961,274, filed Apr. 24, 2018.
Hill, et al. "Spatial Diveristy for Relative Position Tracking" U.S. Appl. No. 15/404,668, filed Jan. 12, 2017.
Hill, et al. "Package Tracking Systems and Methods" U.S. Appl. No. 15/091,180, filed Apr. 5, 2016.
Seiger, et al. "Modular Shelving Systems for Package Tracking" U.S. Appl. No. 15/270,749, filed Sep. 20, 2016.
Hill, et al. "Video for Real-Time Confirmation in Package Tracking Systems" U.S. Appl. No. 15/416,366, filed Jan. 26, 2017.
Piotrowski, et al. "Light-Based Guidance for Package Tracking Systems" U.S. Appl. No. 15/416,379, filed Jan. 26, 2017.
Min, et al. "Expandable, Decentralized Position Tracking Systems and Methods" U.S. Appl. No. 15/446,602, filed Mar. 1, 2017.

\* cited by examiner

MODULAR SHELVING SYSTEMS FOR PACKAGE TRACKING

RELATED APPLICATIONS

This application is a continuation-in-part of U.S. application Ser. No. 15/091,180, filed Apr. 5, 2016, titled "Package Tracking Systems and Methods", which claims the benefit of and priority to U.S. provisional application No. 62/143,332, filed Apr. 6, 2015, titled "Package Tracking System using Sensors," and to U.S. provisional application No. 62/221,855, filed Sep. 22, 2015, titled "Package Tracking System using Sensors," the entireties of which non-provisional and provisional applications are incorporated by reference herein.

FIELD OF THE INVENTION

The invention relates generally to systems and methods of tracking packages and other assets.

BACKGROUND

The shipping of packages, including, but not limited to, letters, parcels, containers, and boxes of any shape and size, is big business, one that grows annually because of online shopping. Every day, people and businesses from diverse locations throughout the world ship millions of packages. Efficient and precise delivery of such packages to their correct destinations entails complex logistics.

Most package shippers currently use barcodes on packages to track movement of the packages through their delivery system. Each barcode stores information about its package; such information may include the dimensions of the package, its weight and destination. When shipping personnel pick up a package, he or she scans the barcode to sort the package appropriately. The delivery system uses this scanned information to track movement of the package.

For example, upon arriving at the city of final destination, a package rolls off a truck or plane on a roller belt. Personnel scan the package, and the system recognizes that the package is at the city of final destination. The system assigns the package to an appropriate delivery truck with an objective of having delivery drivers operating at maximum efficiency. An employee loads the delivery truck, scanning the package while loading it onto the truck. The scanning operates to identify the package as "out for delivery". The driver of the delivery truck also scans the package upon delivery to notify the package-delivery system that the package has reached its final destination.

Such a package-delivery system provides discrete data points for tracking packages, but it has its weaknesses: there can be instances where the position or even the existence of the package is unknown. For example, a package loader may scan a package for loading on delivery truck A, but the package loader may place the package erroneously on delivery truck B. In the previously described package-delivery system, there is no way to prevent or quickly discover this error.

Further, package-delivery systems can be inefficient. Instructions often direct the person who is loading a delivery truck to load it for optimized delivery. This person is usually not the delivery person. Thus, his or her perception of an efficient loading strategy may differ greatly from that of the person unloading the vehicle. Further, different loaders may pack a vehicle differently. Additionally, the loader may toss packages into the truck or misplace them. Packages may also shift during transit. Time expended by drivers searching for packages in a truck is expended cost and an inefficiency that financially impacts the shippers.

Industry has made attempts to track packages efficiently. One such attempt places RFID (Radio Frequency Identification) chips on the packages. Such a solution requires additional systems and hardware. For instance, this solution requires the placement of an RFID tag on every package and the use of readers by package loaders or the placement of readers throughout the facility to track packages.

SUMMARY

All examples and features mentioned below can be combined in any technically possible way.

In one aspect, a shelving system comprises at least one shelf, a camera fixed at a distance from the at least one shelf such that a field of view of the camera faces the at least one shelf and closely encompasses the at least one shelf, and a controller in communication with the camera. The controller has a processor adapted to receive images captured by the camera within the camera's field of view and to determine from the images whether a particular object has been placed on, moved, or removed from the at least one shelf.

In another aspect, a shelving system kit comprises a camera configured for mounting at a distance from at least one shelf such that a field of view of the camera faces the at least one shelf and closely encompasses the at least one shelf, and a controller adapted to communicate with the camera. The controller has a processor adapted to receive images captured by the camera within the camera's field of view and to determine from the images whether a particular object has been placed on, moved, or removed from the at least one shelf.

In still another aspect, a package tracking system comprises a plurality of shelving systems disposed in a package tracking area. Each shelving system includes at least one shelf, a camera fixed at a distance from the at least one shelf such that a field of view of the camera faces the at least one shelf and closely encompasses the at least one shelf, and a controller in communication with the camera. The controller has a processor adapted to receive images captured by the camera within the camera's field of view and to determine from the images whether a particular object has been placed on, moved, or removed from the at least one shelf. The package tracking system further comprises a master controller in communication with each controller of the plurality of shelving systems.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
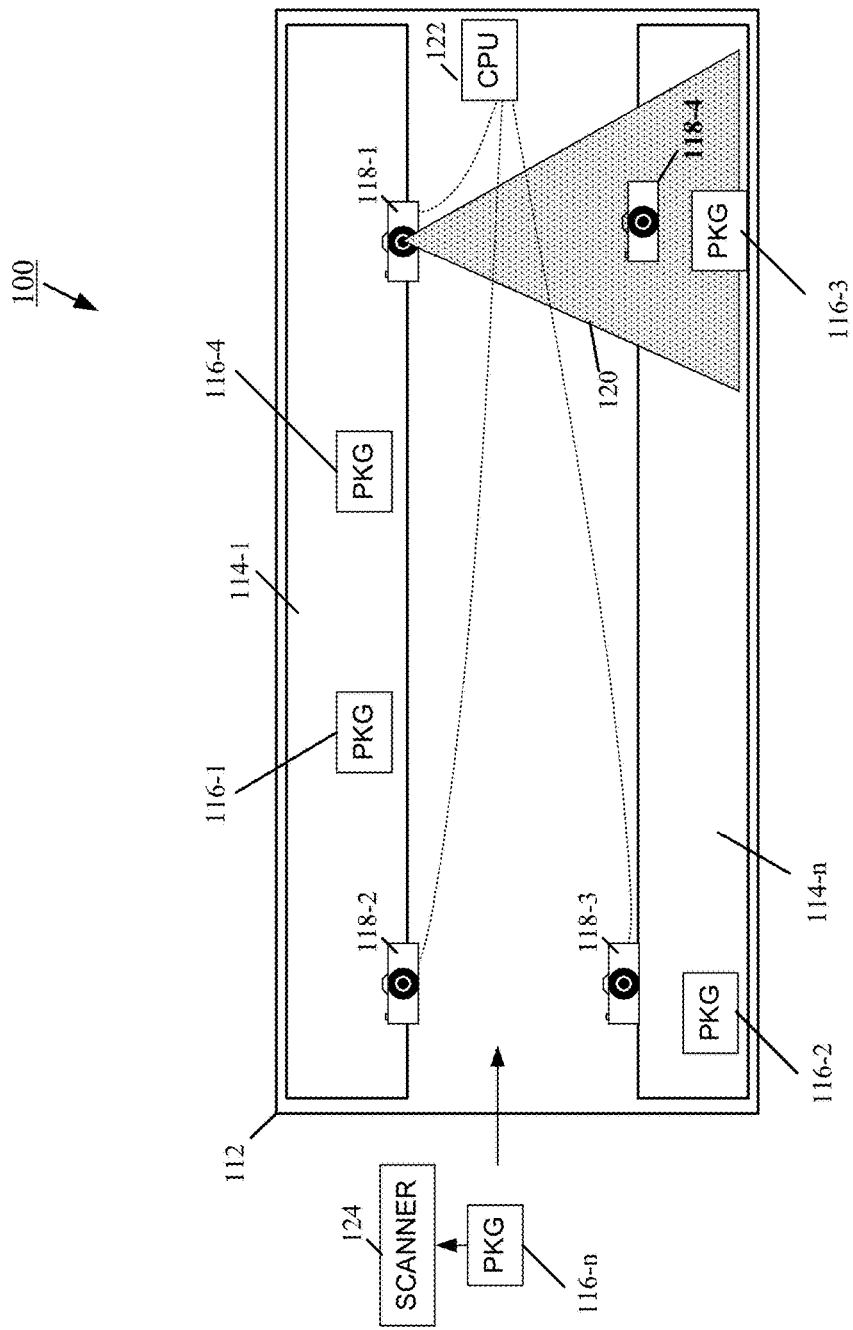
FIG. 1 is a view of an embodiment of a package tracking system.

Package tracking systems described herein actively track packages continuously. Advantageously such systems may not require major alterations in personnel behavior and can be implemented with low hardware cost. In general, these systems employ cameras, depth sensors, or other optical sensors (herein referred to generally as cameras) to track packages, objects, assets, or items (herein referred to generally as packages). The cameras are placed in or adjacent to the holding area for the packages, for example, the cargo bay of a delivery vehicle or a package room. One or more cameras can also be situated near a package conveyor or roller belt, to track the movement of packages optically before the packages are placed into a holding area. A package barcode is scanned in conjunction with it being moved into the holding area. As used herein, a barcode is any readable or scannable medium, examples of which include, but are not limited to, an electronic, magnetic, optical, electromagnetic, infrared, or semiconductor media, or any suitable combination thereof. Package identification information about the package is determined from scanning the package barcode. Such package identification information typically includes dimensions, weight, contents or other information that may be utilized to detect and track the package.

An image processor analyzes the video stream from the cameras associated with the holding area to detect the presence of the package(s) contained within. When a package is identified, the image processor determines if the package corresponds to the package data derived from the package barcode. If the package barcode data and package image data match with a high degree of confidence, the system marks the package as existing within the camera area of coverage (e.g., within the delivery vehicle). Any user that thereafter views a stream of the camera view or a static image of the packages inside the holding area may receive an overlay that identifies the packages contained therein and their precise location.

Weight sensors may be placed on either or both sides of the shelves (or within a shelf) to further increase the degree of confidence that the package identified by the camera (and matched to the package barcode data) corresponds to that package just placed on the shelf. Techniques for increasing the confidence that the correct package has been placed onto, or removed from, a shelf are described in U.S. patent application Ser. No. 15/259,474, filed Sep. 8, 2016, titled "System and Method of Object Tracking using Weight Confirmation," the entirety of which is incorporated by reference herein.

A package tracking system can also employ one or more guidance mechanisms (e.g., audible, visual) to guide placement of a package into a holding area or to bring attention to the present location of a package (e.g., for purposes of removal).

Implementations of package tracking systems can employ modular shelving systems. Each shelving system includes a camera and a controller dedicated to image processing for a particular shelf or set of shelves. The camera is held in a fixed place in front of the shelves being monitored. For example, an arm can be attached to a shelving frame to hold the camera in place. The camera sends its captured images to the controller. A processor of the controller determines whether a particular object (e.g., a package) has been placed within or removed from the field of view of the camera.

Such modular shelving systems can be marketed, sold, and distributed as kits. A kit includes the camera and the controller. Optionally, the kit can also include an apparatus for mounting the camera where its field of view would closely encompass the shelving, a laser light (or similar light projector or emitter) and gimbal, shelving, a display screen, or any combination thereof.

FIG. 1 shows a view of one embodiment of a package tracking system 100 deployed in a tracking area 112. Example embodiments of the tracking area 112 include, but are not limited to, the cargo bay of a delivery truck or water-going vessel, a storage room, a package room, a closet, an open-area used for placing or safekeeping objects, a bay of a delivery plane, and a warehouse. For illustrative purposes, the tracking area 112 includes a plurality of shelves 114-1, 114-n (generally, shelf or shelves 114), and on the shelves 114 are packages and/or assets 116-1, 116-n (generally, package 116). In some embodiments, the tracking area 112 includes one or more modular shelving systems as described in more detail in connection with FIGS. 9-12.

Shipper systems typically identify and track packages 116 using barcodes. A barcode is placed on a package 116 when the shipper takes possession of the package. The barcode includes package identification information about the package, including the package dimensions, identification number, delivery address, shipping route and other data. The term barcode is to be broadly understood herein to include images or markings on a package that contain information or data (coded or otherwise) pertaining to the package. The barcode on the package is initially scanned into the system 100 with a scanner 124.

In general, the scanner 124 may be optical, magnetic, or electromagnetic means, depending on the type of barcode on the package. The scanner 124 may be a conventional barcode scanner or a smart phone or tablet-like device. The form factor of the scanner 124 is not limiting. Example embodiments of the scanner 124 and techniques for wirelessly tracking the scanner 124 are described in U.S. patent application Ser. No. 14/568,468, filed Dec. 12, 2014, titled "Tracking System with Mobile Reader," the entirety of which is incorporated by reference herein.

The system 100 includes an optical system. In this embodiment, the optical system includes four optical sensors represented by cameras 118-1, 118-2, 118-3, and 118-14 (generally, camera 118). Each camera 118 has a field of view 120 covering a portion of the area within which the packages 116 lie (to simplify the illustration, only one field of view is shown). An appropriate number of cameras 118 can be mounted inside the tracking area 112 in such a way to provide a complete field of view, or at least a functionally sufficient field of view, of the area 112, and, in some cases, of an area outside the area 112 (e.g., a conveyor belt moving the packages prior to loading). Before the system 100 begins to operate, each camera position is fixed to ensure the camera(s) cover the tracking area 112. The exact position and number of cameras 118 is within the discretion of the system designer.

The camera 118 may be a simple image or video capture camera in the visual range, an infrared light detection sensor, depth sensor, or other optical sensing approach. In general, this camera enables real-time package tracking when the package is within the camera's area of coverage. The area of coverage is preferably the shelves 114 and tracking area 112. In some instances, the field of view can extend beyond the tracking area 112, to ensure that the packages scanned outside the tracking area 112 correspond to those packages placed inside the tracking area 112.

In addition, each camera 118 is in communication with a processor 122 (CPU 122), for example, a DSP (digital signal processor) or a general processor of greater or lesser capability than a DSP. In one embodiment, the CPU 122 is a Raspberry Pi, but could also be any number or type of computer systems. Although shown as a single CPU within the tracking area 112, the processor 122 can be a processing system comprised of one or more processors inside the tracking area, outside of the tracking area, or a combination thereof. Communication between the cameras 118 and the CPU 122 is by way of a wired or wireless path or a combination thereof. The protocol for communicating images, the compression of image data (if desired), and the image quality required are within the scope of the designer.

In one embodiment, the cameras 118 are video cameras running in parallel, and the cameras simultaneously provide images to the CPU 122, which performs an image processing solution. For this approach, the images are merged into a pre-determined map or layout of the tracking area 112 and used like a panorama. (Alternatively, or additionally, the CPU 122 can merge the images into a mosaic, as described in more detail below). The camera images are synchronized to fit the map and operate as one camera with a panorama view. In this embodiment, two (or more) cameras capture two different perspectives and the CPU 122 flattens the images by removing perspective distortion in each of them and merges the resulting image into the pre-determined map.

An image stitching process usually first performs image alignment using algorithms that can discover the relationships among images with varying degrees of overlap. These algorithms are suited for applications such as video stabilization, summarization, and the creation of panoramic mosaics, which can be used in the images taken from the cameras 118 (i.e., optical sensors) in the described system.

After alignment is complete, image-stitching algorithms take the estimates produced by such algorithms and blend the images in a seamless manner, while taking care of potential problems, such as blurring or ghosting caused by parallax and scene movement as well as varying image exposures inside the environment at which the cameras are placed in. Example image stitching processes are described in "Image Alignment and Stitching: A Tutorial", by Richard Szeliski, Dec. 10, 2006, Technical Report, MSR-TR-2004-92, Microsoft Research; "Automatic Panoramic Image Stitching using Invariant Features," by Brown and D. Lowe, International Journal of Computer Vision, 74(1), pages 59-73, 2007; and "Performance Evaluation of Color Correction Approaches for Automatic Multiview Image and Video Stitching," by Wei Xu and Jane Mulligan, In Intl. Conf on Computer Vision and Pattern Recognition (CVPR10), San Francisco, Calif., 2010, the teachings of which are incorporated by reference herein in their entireties.

In an alternative embodiment, a mosaic approach may be utilized to integrate camera images. In this embodiment, one camera 118 is used for a certain area, a second (or third or fourth) camera 118 is used for another area, and a handoff is used during the tracking, with the images from cameras 118 being run in parallel on the CPU 122. In a mosaic, like a panorama approach, image data from the multiple cameras (or from other sensors) are merged into the map of the tracking area 112 (e.g., truck, container, plane, etc.) with each viewpoint designated for the area that is seen by the camera 18. It will be recognized that in both embodiments, a handoff is made when objects move from one viewpoint to another or are seen by one camera and not the others. These handoffs may be made using the images running in parallel on the cameras 118, with the package placement and movement determined by the CPU 122 using whichever camera has the best view of the package 116.

In an alternative embodiment, if the system 100 is using depth sensors, the image stitching operation can be omitted and each camera stream data is processed independently for change, object detection and recognition. Then, the result "areas of interest" are converted to individual point clouds (described further in connection with FIG. 6C) and transformed in to a single common coordinate system. The translation and rotation transformations used for this process are based on the camera sensors position and orientation in relations with each other. One camera is picked as the main sensor and all other camera data is transformed into the main coordinate system, achieving the same end result as the image stitching procedure, namely, unification of package coordinates between sensors.

In one embodiment, the image processing is performed by the CPU 122. Alternatively, if bandwidth is not a significant concern, the image data can be transferred to a central server (FIG. 2) and image processing may be performed by the central server. Those of ordinary skill in the art will recognize that any controller, CPU, graphics processor or other computing device capable of processing image data to perform the image analysis described herein may be utilized.

The image-processing CPU 122 creates the aforementioned map of the tracking area 112 under surveillance. Locating the shelves 114 assists the image processor 112 identification edge locations of packages 116. Further, a prior calculation of the distance of each camera 118 from shelves 114 assists in properly calculating package dimensions. In one embodiment, a single reference dimension is needed and dimensions of a tracked asset 116 can be determined at any position in space relative to the known dimension. In case of image or video cameras only, a dimension reference has to be related to position in the tracking area 112 (i.e., the length and depth of the shelves are known, thus the dimensions of a package placed on these shelves can be determined in relation with these shelves). In this embodiment, pixel count or vector distances of contours of these pixels can represent the package 116 and be used to help determine relevant package dimension data.

Figure 2:
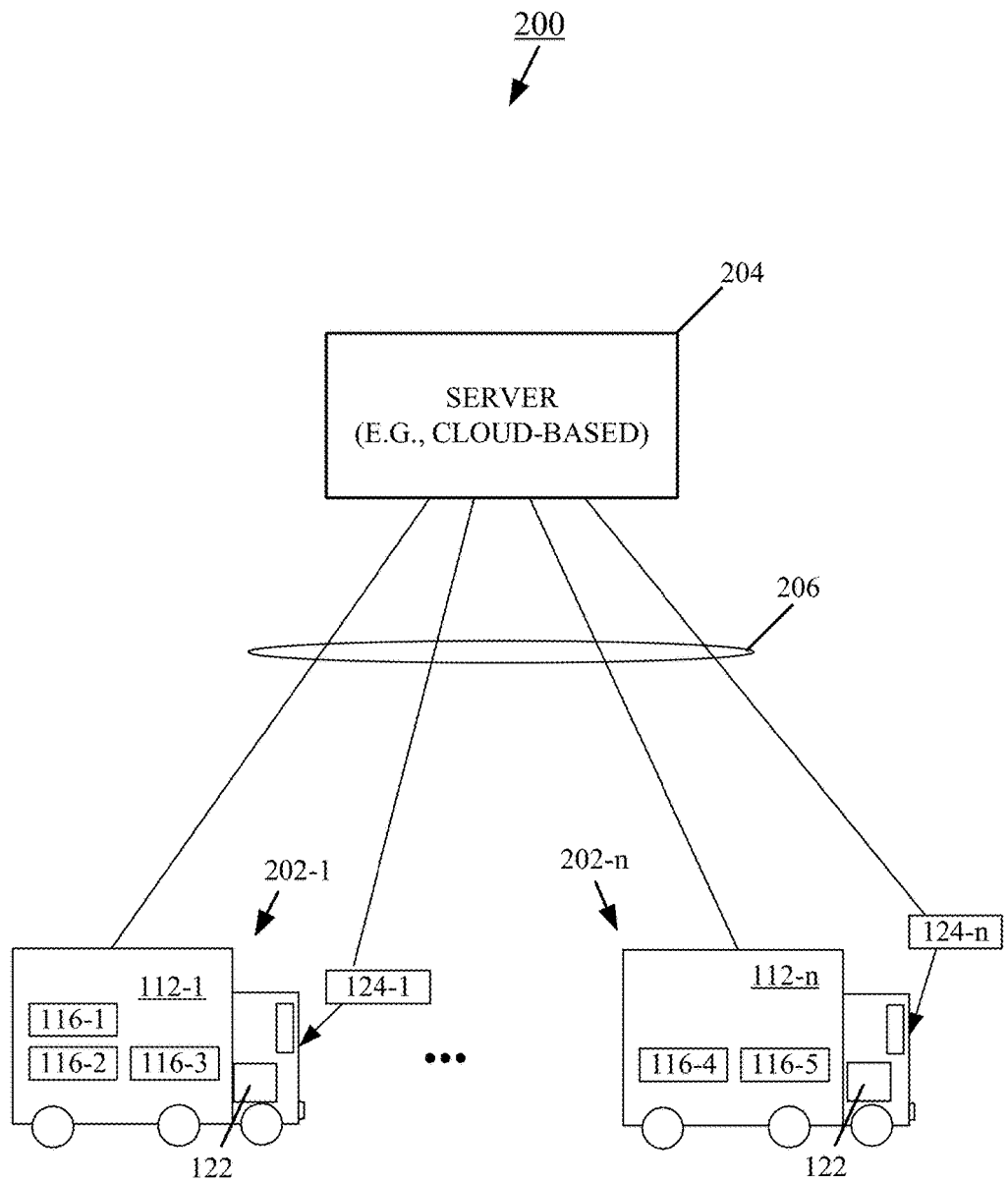
FIG. 2 is a diagram of an example implementation of the package tracking system within a delivery system.

FIG. 2 shows an example of an implementation of the package tracking system 100 (FIG. 1) within a delivery system 200. For illustration purposes, the delivery system 200 includes multiple delivery vehicles 202-1, 202-n (generally, 202) and scanners 124-1, 124-n (generally, 124) used by personnel to obtain package identification information from packages. Although shown in FIG. 2 as trucks, a delivery vehicle 202 may be any form of transport, including, but not limited to, an airplane, automobile, van, seagoing vessel, train, airplane baggage cart. The delivery vehicles 202 and scanners 124 are in communication with a central server (or servers) 204 over communication connections 206. The server 204 (or servers) can be cloud based, meaning that a provider of the server 204 makes applications, services, and resources available on demand to users over a network (e.g., the Internet). The communication connections 206 may be established using any type of communication system including, but not limited to, a cellular network, private network, local network, wired network, wireless network, or any combination thereof.

The scanners 124 are in communication with the central server 204, either continuously or through data dumps, to transfer package identification information when a barcode on a package is scanned and the location. Typically, the location of the scanner 124 is generic (e.g., "Atlanta").

Each delivery vehicle 202 includes a tracking area 112, containing packages 116, and a processor 122. Each delivery vehicle 202 may have a GPS system (FIG. 7) for use in directing and tracking the vehicle 202. The cloud-based server 204 (or a central controller, not shown) identifies the appropriate shipping route, and the next appropriate delivery vehicle, if any. The delivery vehicles 202 may also communicate data (e.g., package identification information) to the central server 204. The transfer of data between the vehicles 202 and the central server 204, like the scanners, can be continuous or intermittent (e.g., data dumps). Based on such communications, the central server 204 not only can track the delivery vehicles 202, but also the progress of the packages 116 they carry through the shipping route. The central server 204 can use the package identification information to notify the driver of the next appropriate delivery vehicle, through the scanner of the driver, to expect the package.

Figure 3:
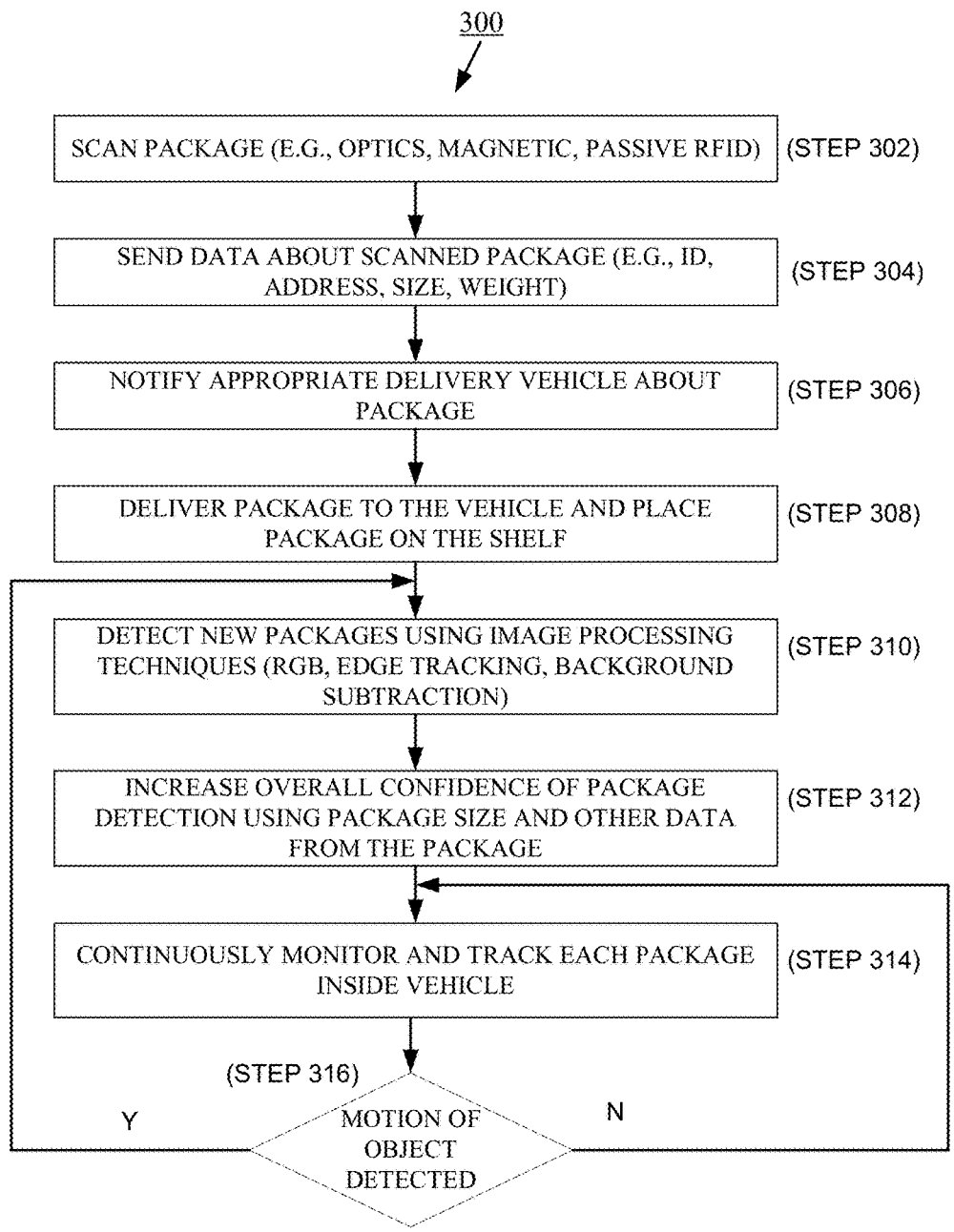
FIG. 3 is a flow diagram of an embodiment of a process for general package tracking.

FIG. 3 shows an embodiment of a process 300 for general package tracking. For purposes of illustrating the process 300 by example, reference is made to the delivery vehicle 202-1 and other elements of FIG. 2. Before loading a package 116-1 onto the delivery vehicle 202-1, a loader uses a scanner 124-1 to scan (step 302) a barcode associated with the package 116-1. The scanner 124 transmits (step 304) the barcode (package identification) information to the image-processing CPU 122 of the delivery vehicle 202-1 or to the central server 204, which can then transmit the data to the CPU 122. Transmission of this information may be by Bluetooth, WIFI or other communication protocols, wired or wireless. By receiving the barcode information (e.g., identification number, size, color) describing the package 116-1, the image-processing CPU 122 becomes notified (step 306) of the package 116-1 and expects this package 116-1 to be subsequently loaded onto the delivery vehicle 202-1. A loader places (step 308) the package 116-1 on a shelf of the vehicle 202-1. Light-based guidance (for example) may be used to direct the loader to the particular vehicle 202-1 upon which to load the package, the particular location on the shelf where to place the package 116-1, or both.

The image-processing CPU 122 detects (step 310) the presence of the package 116-1, as described in more detail in connection with FIG. 5. The image-processing CPU 122 then attempts to identify (step 312) the detected package as that package expected to be loaded (i.e., from step 306). Identifying the package 116-1 generally entails comparing certain visible characteristics of the package 116-1 to certain barcode information obtained during the scanning operation. In one embodiment, the size of the package measured using the camera(s) 118 of the delivery vehicle 202-1 is compared to the expected package dimensions as read from the barcode. In another embodiment, the image processor 122 registers the package 116-1 by virtue of the package 116-1 being the first package detected after notification (at step 306) of the package 116-1 being scanned. In such an instance, the image processor 122 can register the package 116-1 by associating image data captured by the camera(s) with the identification number read from the barcode of the detected package 116-1.

Figure 4A:
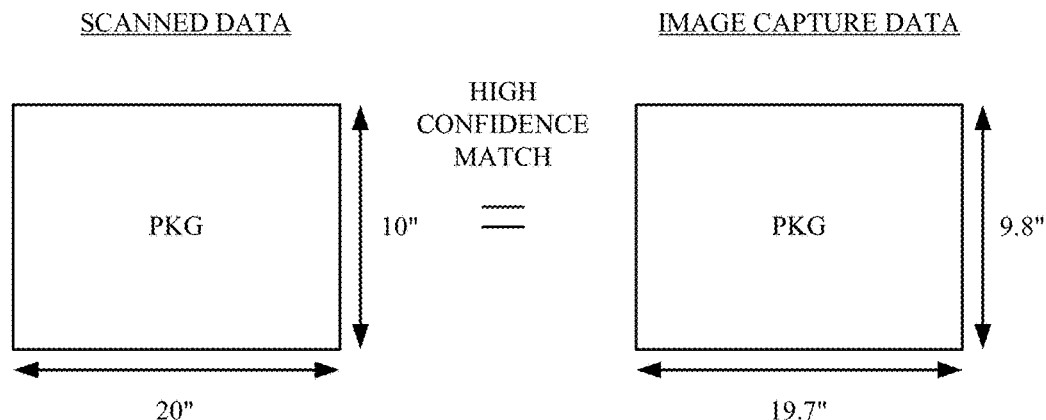
FIG. 4A is a diagram illustrating an example of a match between a detected package and a scanned package.

FIG. 4A shows an example of when such a comparison produces a match, thereby signifying a high level of confidence that the appropriate package was loaded on the delivery vehicle 202-1. In this example, the scanned barcode data identify the package 116-1 to be loaded as having package dimensions of 10" by 20". The images captured by the camera(s) 118 on the delivery vehicle 202-1 indicate that a package with dimensions of 9.8" by 19.7" was loaded on the delivery vehicle 202-1. The image-processing CPU 122 is configured to consider the differences between the dimensions of the captured images and the dimensions according to the barcode data to fall within acceptable criteria for declaring a match.

Figure 4B:
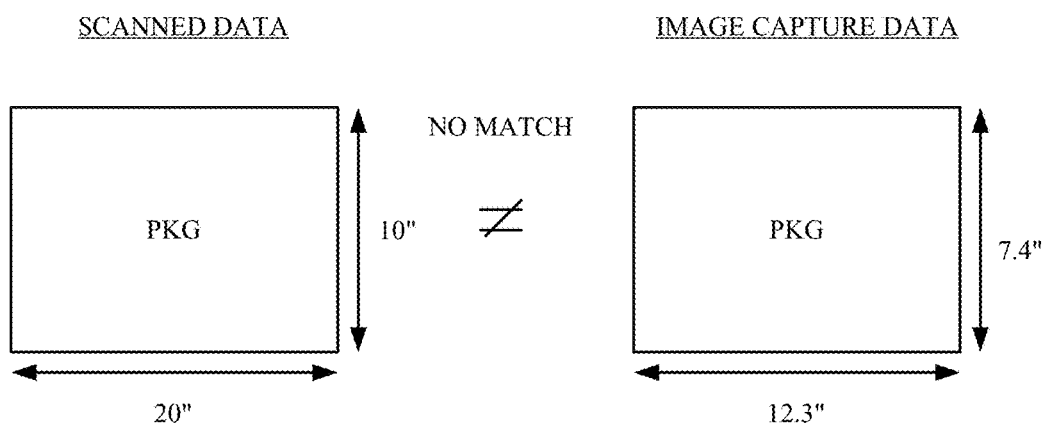
FIG. 4B is a diagram illustrating an example of a mismatch between a detected package and a scanned package.

FIG. 4B shows an example of when a comparison does not produce a match. In this example, a 10" by 20" package is scanned, but subsequent image capture data shows that a 7.4" by 12.3" package was loaded onto the delivery vehicle 202-1. The image-processing CPU 122 can be configured to consider the differences between the dimensions to be too great to consider the detected package as a match to the scanned package.

Referring back to FIG. 3, if the data captured by the barcode scanner matches (within a predetermined threshold) the package image data captured by the camera 118, a match occurs. The matched package is not only marked or identified in real time as being within the delivery vehicle 202-1, but also the exact location of the package 116-1 in the vehicle may be made continuously available to the central server 204, loader, driver or anyone else with access to the system 200. This information, which may be referred to hereafter as package location data, can be stored on memory associated with the image-processing CPU 122. Package location data includes the dimension information detected for the matched package associated with the location of the package within the delivery vehicle 202-1. More specifically, the image-processing CPU 122 may overlay the initially created vehicle map with the package identification information in the corresponding location. If communications allow, marked package location data may be stored in memory at other locations, including (or additionally) in the central server 204.

As stated previously, the image-processing CPU 122 includes wireless communication (commonly Bluetooth, Wi-Fi, or other communication methods and protocols suitable for the size of the area of coverage of the camera). The image-processing CPU 122 continuously receives (step 314) real-time views captured by the cameras 118 in the delivery vehicle 202-1. Because the location of the matched package is stored in memory of the image-processing CPU, the real-time image data from the camera 118 is streamed to a handheld or fixed or mounted view screen to show the live view of the package overlaid with augmented reality markings identifying the package. The image-processing CPU 122 continuously monitors and tracks (step 314) within the vehicle 202-1 until motion of an object is detected (step 316). In response to the detection of motion, the process 300 returns to detecting packages at step 310.

Implications of such real-time tracking can be appreciated by the following illustration. A driver entering the delivery vehicle 202-1 may not and need not have any personal knowledge of what packages were loaded where in the vehicle. Instead, the driver carries a view screen (often in the form of a handheld tablet, smartphone, or scanner) that displays a stream of one of the cameras 118 in the cargo bay of the vehicle 202-1. The image appearing on the view screen includes marks identifying various packages. A mark may be a box around the live view of the package with text stating the package name, identifier, intended addressee or most efficient package identifier. Upon arriving at a stop for an intended package addressee, for example Mr. Jones, the driver can walk to the back of the delivery vehicle. The system 200 may automatically display the package(s) intended for delivery to Mr. Jones using highlighting or demarcating for easy location. Alternatively, the driver can search the image data on the view screen for markings labeled "Jones" and such packages are be demarcated on the view screen for easy location. In addition, the system 200 may employ light-based guidance to show the driver the location of the package.

In some embodiments, multiple live streams of the cargo in a vehicle are available, with one camera (e.g., 118-1 of FIG. 1) covering one area of the cargo bay and another camera (e.g., 118-2 of FIG. 2) covering another area of the cargo bay. The system 200 can thus quickly and effectively permit a loader or delivery person who enters the cargo area to locate a package using the camera stream overlaid with package marking (location). For a person using a tablet viewing the cargo area, the "video stream" in one embodiment can be a static image of the delivery vehicle sent from the image-processing CPU. Since the central map of the delivery vehicle can be used for positioning the packages, that central map, with the location of each package of interest, is what is used for viewing on a device.

Figure 5:
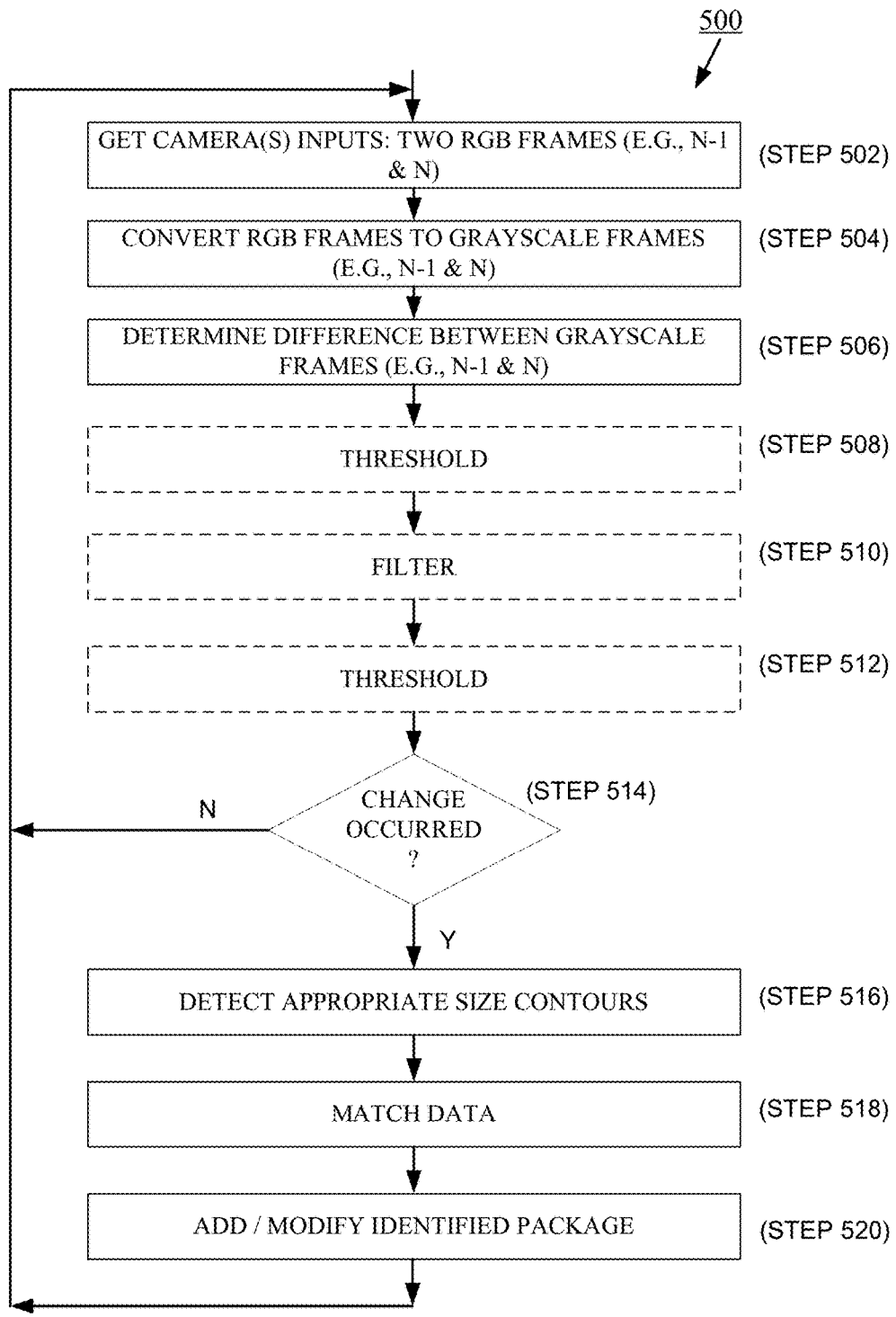
FIG. 5 is a flow diagram of an embodiment of an image-processing process for identifying and matching a package.

FIG. 5 shows an embodiment of an image-processing process 500 for identifying and matching a package. In a description of the process 500, reference is made to elements of FIG. 1. At step 502, color data (e.g., RGB) for at least two image frames (N and N−1) are acquired from a camera 118. The color data is converted (step 504) to grey scale data for the at least two image frames. Those of ordinary skill in the art are familiar with producing grey scale data from color image sensors.

At step 506, an absolute difference is determined across the two images to detect the presence of new objects. To quicken the processing, threshold detection (step 508) may be utilized to detect regions of interest. In addition, in those regions of interest data may be filtered (step 510) to limit the amount of data processed. After filtering, threshold detection (step 512) may be utilized on the filtered data.

At step 514, if no changes between the grayscale images are found, this indicates a high probability of no new package being located; the system 100 does not identify or mark a package. For instance, the loader may not have moved or loaded a package, or a new package cannot be located. The system 100 then acquires (step 502) the next temporal two frames (N and N+1). Sampling frequency may be continuous or at regular intervals according to designer preference, available processing power, and bandwidth.

If a change in the images (N and N−1) is detected at step 514, further analysis occurs. For example, the change detected by the system 100 may be the detection of the presence of the loader in the image. Alternatively, if changes in the images are indicative of a package moving, the image-processing CPU 122 also continues to work on the current image data (frame N and N−1).

Those of ordinary skill in the art will recognize that a variety of images may be compared to determine loading or movement of a package. For example, an N 'current frame' and N-X 'previous frame' may be tested for motion, where X is greater than 1, and if motion occurs then the N-X frame (before motion occurred) may be saved as a background frame for later processing in comparison to a more recent image frame (i.e., a new N 'current frame'). After motion is stopped, the background frame and a new N current frame are used for package location and identification.

Whenever a new package is located, the package is to be identified. In one embodiment, the image-processing CPU 122 uses edge detection to determine (step 516) the dimensions of the package. Objects that are not compatible with being a package are filtered at this point. For example, if an object size is less than the smallest possible package, the object is ignored. The system 100 can also filter other objects of a size, dimension, or location that do not correspond to a package (e.g., the loader or a clipboard or tablet carried by the loader).

Various metrics may be utilized in addition to or conjunction with those described above to aid in identifying a package. For example, any object placed on a shelf (mapped as described above) may be weighted logically so as to be presumed to be the last scanned package. The package size, color (if cameras are color), contours or other distinguishing characteristics may be compared to any data captured by the barcode scanner. As previously described, when a package barcode is scanned, the system 100 expects that the next package detected will match the scanned package. Reliance on this assumption is accurate provided loaders handle packages sequentially, that is, a barcode of a package is scanned and then that package is sorted and moved appropriately. This prior knowledge facilitates package identification and position registration.

At step 518, the package dimensions are used to match the package to the scanned barcode data, as described previously in connection with FIG. 3. The size of a package as determined from image data is compared to the predicted package size based on barcode-scanned data to determine a package match. If the match occurs, the system 100 marks (step 520) the loaded package as identified as described in more detail below. The system 100 provides a cue to anyone entering the cargo area of a delivery vehicle as to the location and identification of packages kept within.

In addition to view screens, other package location identification methods can be used to improve the locating process. For example, as a vehicle arrives at the destination address for the delivery of a certain package, a light projector (LED, laser or other) can be used to shine focused light, or a particular color light, on the location of the package within the cargo area to show the delivery person exactly where the "matched" package is in the vehicle. The focused light can be altered to change colors, blink, flash, or shine a pattern to signal additional information to the delivery person, for example, priorities of delivery and warnings of weight, or to signify that the package of interest is behind or under another package. Information is directly overlaid on the package that to be picked up, without needing any other screen or sound interface that might consume time to read or hear and consequently prolong the delivery process.

The above discussion assumes that a package that is scanned is relatively quickly matched to a package placed in the delivery vehicle. However, there may be instances where no match occurs or where a delay in matching occurs. This may occur if the package is loaded on the wrong truck, the driver scans one package but loads a different package, the driver tosses a package into the truck but not within video coverage (e.g., the package is occluded from view) or the driver's body occludes video coverage of a package.

In such situations, an embodiment of the system 100 requires a deliverable (i.e., a particular outcome) after a package is scanned. For example, if no package is detected that matches the scanned package, the system 100 may disallow further packages from being scanned, the system 100 may mark the package as scanned but unidentified, issue a warning to the loader, notify a central server of an unidentified package, or any combination thereof. The system designer may choose how rigidly to require package identification and processing (i.e., no further scanning until the package is appropriately tracked or just marking the package as scanned but with an unconfirmed loading status).

In some situations, a package may be loaded without having been scanned. This may be a loader error, where the loader places the package on the wrong truck, or may be intentional as in the case of theft. In these situations, the image-processing CPU 122 still recognizes the existence of a loaded package, but there will be no "match" of the loaded package to a scanned package. Such a package may be "marked" in image streams as "unidentified", instead of with data identifying the package, and the system may issue a "warning" to the loader (visual/auditory or other) that an unidentified package is in the vehicle. The warnings may allow the loader (or driver) to correct the issue by scanning the package, placing the package in the camera view and producing an appropriately matched package. Alternatively, the system 100 may be constructed to disallow further scanning of packages if such errors occur, may issue warnings, may send the errors to the central server, or any combination thereof. In one example of an unidentified package being loaded into a delivery vehicle, the driver upon first entering the delivery vehicle may receive a notice that 300 packages have been loaded in the vehicle, but that one of the packages is "unidentified". The driver's tablet can show the location of the unidentified package, and remedial action may be suggested to, or required from, the driver. Alternatively, a distinct light (i.e., red light) may be directed onto the location where the unidentified package rests.

Detection of a package may be delayed or inhibited by occlusion of the field of view (such as the loader's body or another package). Through prediction from threshold detection from the loader position inside the vehicle cargo area and the vehicle cargo area map already stored by the CPU 122, the system 100 can compare the known map of the vehicle cargo space before the loader enters with a package with the new map of the vehicle cargo space after the loader places a package in the cargo area to determine the location of the package. Thus, even if the loader's body temporarily occludes optical tracking as the package is placed inside the cargo area, the package can be located, identified, and matched by using image frames after the loader leaves the cargo area to frames before the loader entered the cargo area.

In one embodiment, the system 100 performs the process 500 to track packages continuously after they have been scanned, loaded, and "matched". The process 500 enables tracking of matched packages within an area of coverage after a package has been identified ("marked"). Specifically, after a package is loaded and marked in one place, the image-processing CPU 122 can regularly (or continuously) perform the same (or similar) threshold detection to search for a "change" at the location of interest. This accounts for object movement during transport.

In this scenario, the system 100 has identified packages within the area of coverage and no new packages have been scanned. This may represent when the driver is driving the vehicle to a destination. If the image-processing CPU 122 detects a change at or near a package location, a tracking subroutine is invoked. The detection of a change may comprise an image absolute difference comparison between frames as previously described with respect to detailed image processing. The processor 122 analyzes the location of the package within the image at which the change occurred and determines if the package at that location still matches the data for the package captured off the barcode. If the match is identical, the system 100 may continue to label the package as corresponding to the package scanned and placed at that location.

If, however, no package is detected at the location or if the package dimensions do not match the expected package dimensions with a high level of confidence, the image processor 122 searches for an "unidentified" package that matches the moved package dimensions. When the matching package is located, its overlay marking on the cargo system is updated to display the new package location.

The above ability to identify movement of previously located packages is particularly valuable in delivery vehicles. Drivers often shift packages forward in the vehicle during the delivery day to make packages accessible. By monitoring known package locations and tracking the movement of a package to a new location, the system 100 maintains a real time map of package locations.

In another embodiment, the system 100 can be configured to reduce potential human loading errors that occur from a breakdown of a sequential loading pattern of scanning a package then loading that package immediately into truck. This reduction may be achieved by, for example, providing additional scanners over the delivery vehicle loading doors to scan bar codes automatically as packages are placed into the vehicle. Such a system can guarantee that the packages scanned are the packages loaded into the truck. After a package is scanned, it is also viewed by the optical sensors in the vehicle; that direct and almost simultaneous registration improves package identification.

In another embodiment, the system 100 can alternatively provide continuous, real time tracking, albeit with more complicated image processing. In such a system, for example, a person (loader, driver, etc.) may be identified and the system may detect objects located in the vicinity of the hands of the person to determine if the object matches the package expected to be loaded. Further, an algorithm for identifying a package or its unique identifier (size, color, etc.) may be tailored to specific environments or hardware. The tradeoff of such a full real-time tracking system is increased system complexity.

In another embodiment of the system 100, an augmented reality ("AR") real time video view may be presented to the loader/driver. For AR video in real time, a single perspective is shown of the vehicle cargo map with those designated packages needing to be taken being highlighted or lit. The user may view one perspective of the vehicle from the front (or back, depending on how the user is removing the packages, that is, from either the front or from the back), one perspective of the left side of the vehicle and one perspective of the right side of the vehicle associated with each camera. The image-processing CPU 122 may determine where the driver/delivery person is and provide a perspective on the tablet based on the driver position in relation to the package being delivered. As previously described, identifying the user position within the area of coverage is analogous to identifying a package.

Additional package delivery data may be gathered using the present system. For example, the system 100 may track package movement in real time. Therefore, tracking package movement, especially velocity, can help prevent mistreatment of packages through packages being thrown, dropped, or placed in positions that are not secure and risk having the packages fall. By tracking packages movement in real time and determining movement velocity, impact through rough handling can be monitored and reported to improve the quality of the loading and unloading procedures and to prevent damage to the packages. In this embodiment, velocity may be determined by dividing the distance a package moves by the frame rate in which such movement occurs.

Figure 6A:
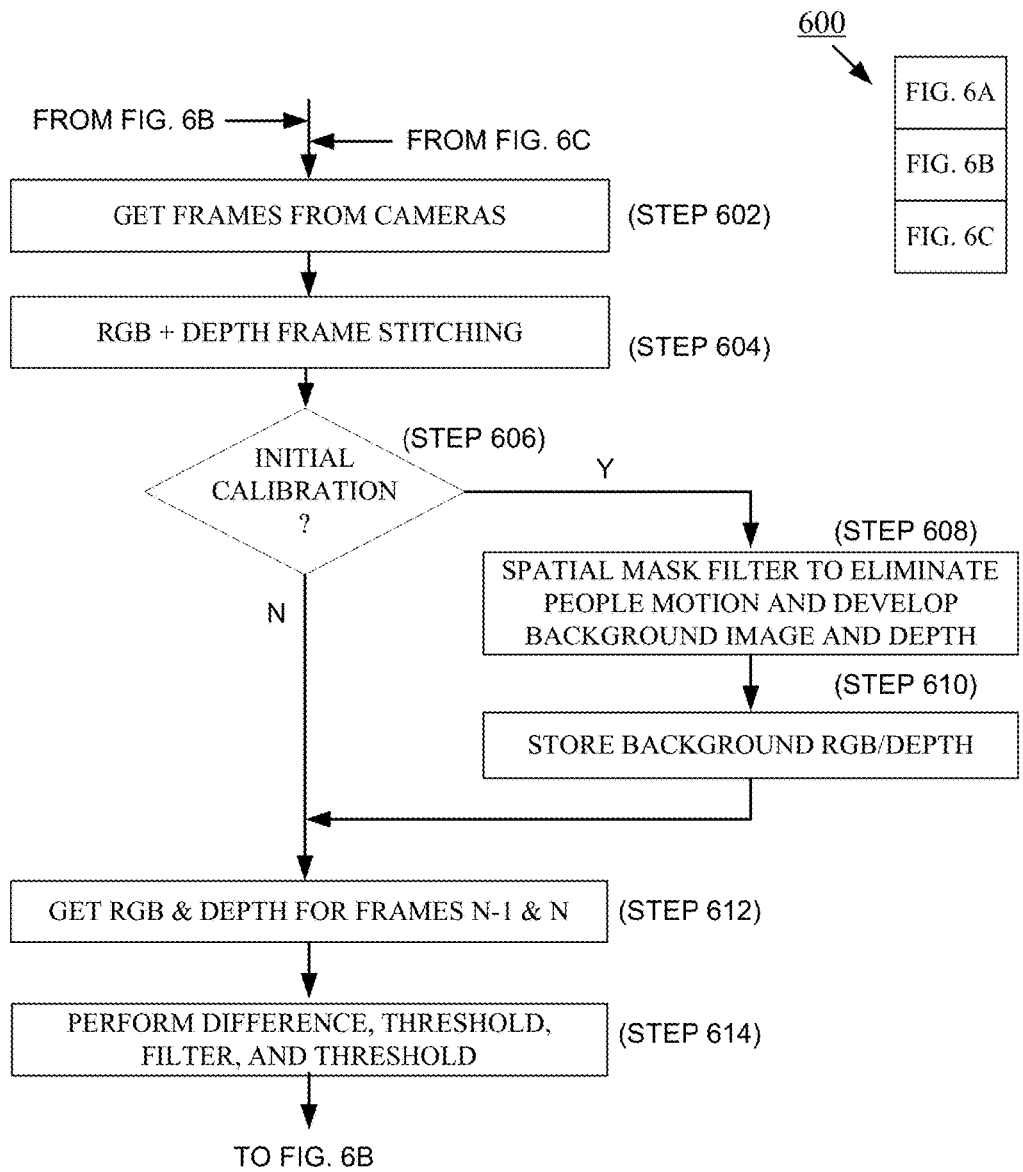
FIGS. 6A, 6B, and 6C together are a flow diagram of an embodiment of an image-processing process that uses depth information to track a package.
Figure 6B:
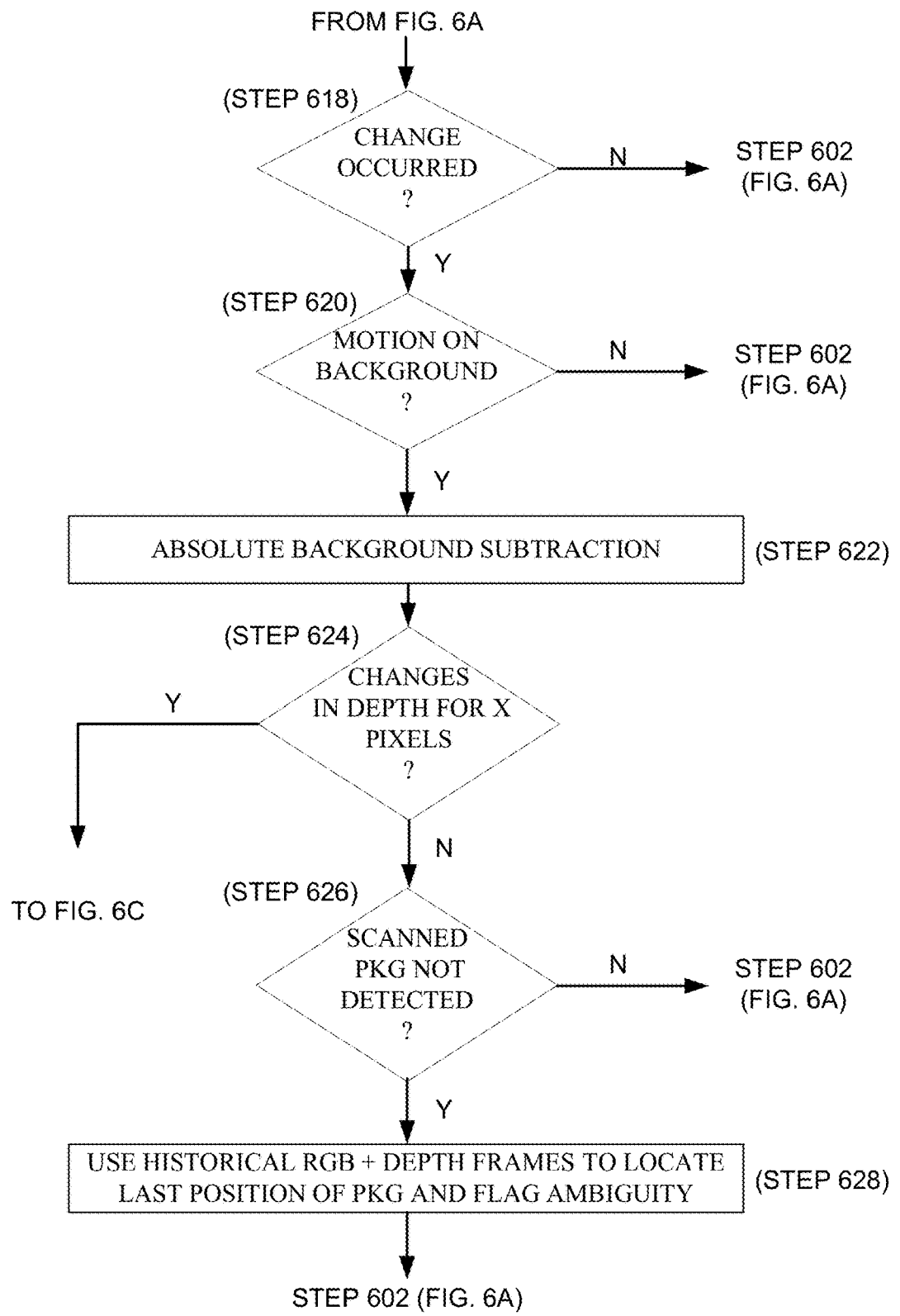
Figure 6C:
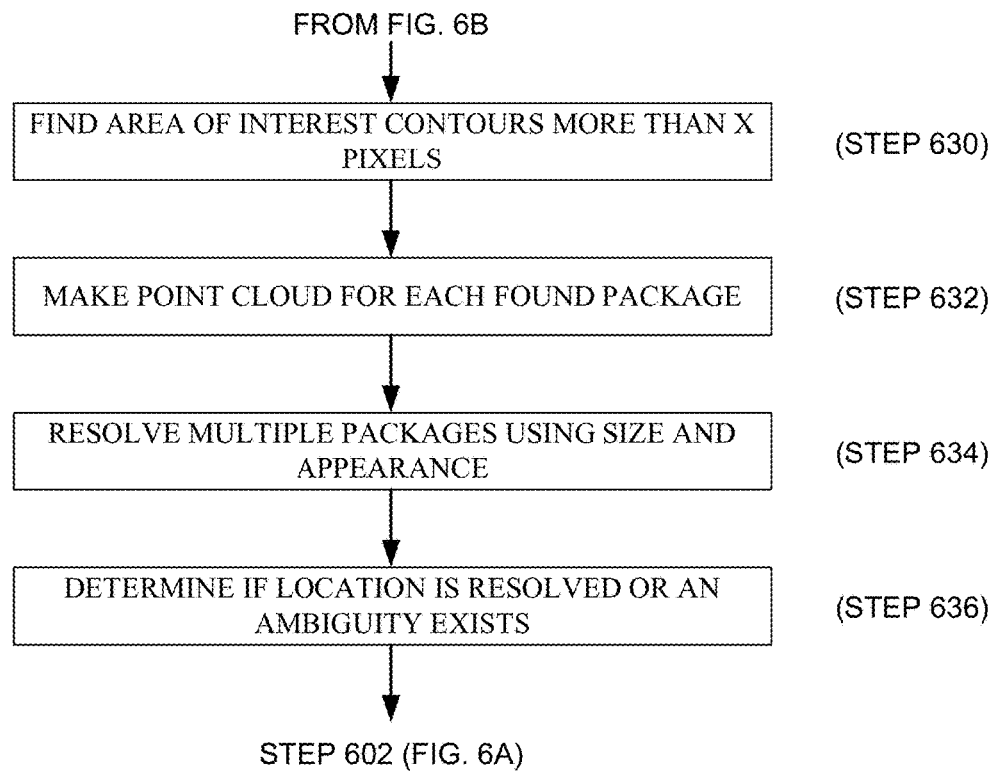

FIGS. 6A, 6B, and 6C together show an embodiment of an image-processing process 600 that uses optical information supplemented with depth information to track a package, product, or item. Specifically, as is familiar to one of ordinary skill in the art, a two-dimensional (2D) optical image capture device (i.e., a camera) with a single aperture is capable of capturing 2D image information on a plane (film, CCD, etc). To acquire three-dimensional (3D) information typically requires acquisition of additional data. Three-dimensional data can be acquired using multiple cameras or by combining one or more cameras with one or more depth sensors. Cameras can utilize visible light, infrared light, or other optical wavelength ranges. Depth sensors can be based on infrared, laser or other wavelength emitters that transmit light to an object, or to a portion of the object. Depth sensors typically determine the distance to the object, or to portion of the object, from the light that is reflected or backscattered from the object. Alternatively, depth sensors can utilize acoustic signals to determine distance. In one embodiment, depth sensing is integrated into the optical camera, for example, the KINECT™ K000949, although other devices can be used.

Referring to FIG. 6A, at step 602, frames are acquired from the camera system. A camera system with depth sensing capability typically outputs video (e.g., RGB, CYMG) and depth field information. Video may optionally be encoded to a well known format, such as MPEG. At step 604, the optical and depth information are stitched together. Open libraries such as OpenCV or OpenNI (used to capture depth images) enable the optical and depth information to be stitched together. Alternatively, a user may develop customized software for generating 3D information for object data generated by optical images and depth sensors.

At step 606, an initial calibration is performed if a calibration has not been previously performed. A function of this initial calibration, which is performed over multiple image frames, is to determine background information both for 2D optical images and depth sensing. Any motion (e.g., people) is extracted or ignored (step 608) during background extraction until stable background optical (RGB) and depth information can be stored (step 610). Calibration may optionally include creation of a foreground or front-ground region. This front region limits the data set for analysis to a region near shelves where objects of interest (e.g., packages) are to be located. Calibration may be performed on start-up, at intervals, be initiated by the user, or by the system, for example, if errors are detected.

After calibration is complete, the resulting spatial filter masks are used to extract the "area of interest." In one embodiment, this area of interest corresponds to the area between the background and the foreground, so everything that is not the wall and the shelves (for background) and not the person in front of the shelves, is ignored. This ignoring of the background and foreground focuses on data within the depth threshold of the area of interest being monitored. Alternatively, the "area of interest" can include a different part of the scene, for example, the foreground in order to see where the person is in later recognition steps and can be expanded or contracted as system requirements dictate. In general, the area of interest applies to any cut-out of a scene that is to be the focus within which to perform object tracking.

Multiple image frames (e.g., N−1 and N) are obtained (step 612) and compared (step 614), similarly to that performed in process 500 (FIG. 5), although the image frames in the process 600 include depth information in addition to RGB data. Image and depth information can be filtered for noise and then processed to determine if a difference between two frames exists. This can be done with edge detection, threshold and difference algorithms, or other image processing techniques. In the process 600, information from the depth sensor is also processed to compare image frames.

Referring to FIG. 6B, when no image change is found (step 618), that is, when depth and optical data remain substantially unchanged, the process 600 continues with the next temporal images received (e.g., N and N+1). When a change is detected, the process 600 determines (step 620) whether a "background" object has moved. If a background object has not moved, the process 600 continues with the next temporal images received (e.g., N and N+1). If a background object is determined to have moved, the system 100 does not have to consider a package for tracking, and further general tracking continues. In this instance, the system 100 may go back to the calibration step to establish a new stable background data set having 2D optical image and depth information.

In one embodiment, the process 600 compares two frames of image information for change, ignoring the background/foreground masks; any actual change in the image triggers further analysis. However, it is less processing and power intensive to detect only changes in the "area of interest" between the background and foreground (if foreground masking is utilized). When the background is stable, at step 622 absolute background subtraction is performed (likewise for foreground). This step allows the resulting 3D information to be processed faster for determining areas of interest in which one or more new packages may by present. Absolute image subtraction may be formed using OpenCV library modules in one embodiment, though other alternative techniques may also be used.

With the background information (and foreground if applicable) subtracted, the process 600 checks (step 624) for changes in depth of any objects in the field of view of the camera(s) and the measurement field of the depth sensor(s). If no changes are found and no package has been scanned (step 626), this indicates that no package has been detected and the next images are processed (step 602). However, if a package was scanned (step 626), but no package was detected, the process 600 can use (step 628) historical optical and depth information (or information from an adjacent wireless tracking system) to register that the last scanned package has not been located, indicate the last known location of the package, and inform the user of the ambiguity.

Referring now to FIG. 6C, if at step 624 a change in the depth of one or more objects has been detected, an area of interest around that region of change is generated (step 630).

In one embodiment, an area of interest is generated using a software module from the OpenCV library, though other techniques may be employed. Typically, though not necessarily, the area of interest also includes movement information or vector information that indicates object motion.

When the area of interest is determined, a "point cloud" is generated (step 632) using the optic sensor(s) extrinsic and intrinsic parameters through algorithms for "2D to 3D" data representation conversion preformed on the RGB and/or depth images obtained and processed through OpenNI and OpenCV. In one embodiment, the Point Cloud Library may be used. The object shape and location information generated from the Point Cloud Library are used to identify and track a package in three dimensions using edge detection, color detection, object recognition and/or other algorithms for determining an object within the scene. If object information is in the shape of a human, for example, then the process 600 continues processing further image data and does not track the human (unless the system 100 tracks user motion). However, if the size, shape or other appearance information indicates that the object is a package, the object is recorded as such. The process 600 resolves (step 634) the identity of a plurality of scanned packages based on this information by comparing expected package size, shape and/or appearance attributes (as established by information associated with scanning a package) with measured information. The use of both optical and depth sensing information allows the system to calculate package size based on the 3D data generated from the camera images and depth sensor data. The identity, location and other information (e.g., time of placement and motion) may be stored at a central server (e.g., 204 of FIG. 2) for later analysis.

When an object is detected and matches a scanned package in size and appearance, the object is registered. A variety of reasons exist for a detected object not to match a scanned package. For example, the object may be partially occluded or a different object may have been substituted. In some instances, further analysis on subsequent image frames is performed to resolve the object size and appearance. In such instances, further image processing occurs until the object is identified or marked unidentified (step 636).

The aforementioned description of the process 600 is with respect to a positive change in an image scene: specifically, a new object is located. A "negative change" can also be detected in a similar fashion and occurs when a package is removed from an area of interest. In such a situation, a difference is not mistaking package occlusion as object removal. Specifically, if a person steps in front of a package, then the system detects the motion and shape of the person. After the person moves away from the front of the package, the image processor 122 detects if the identified package was removed. Note that the user typically scans a package when moving it, so taking a package from a location without scanning it may trigger a flag to the user to scan or identify the package.

In many situations, a second package may be placed so as to partially occlude a first registered package. In those instances, the system 100 looks for evidence based on depth and size information that the first package is still in its original location. Such evidence can be a corner of the package remaining visible behind the second package. If the first package is fully occluded, but not scanned to indicate its removal, then the system 100 may be designed to assume the first package is sitting behind the larger second package.

As previously described, the system 100 detects changes in a field of view to build a database of known packages. The database is used to locate and disregard these registered packages while looking for identifying new objects being placed into the field of view. While the registered packages are "disregarded" when looking for new packages that are being loaded, they are continually monitored to see if they have moved or been removed.

The process 600 may run continuously or be triggered upon user startup, detection of motion, or other triggers. Allowing the system 100 to drop to a lower state of analysis may be desirable in some instances to reduce bandwidth and power consumption. For example, if a delivery vehicle is being loaded, then the system 100 can run at full speed with processing of images at the maximum rate described by the camera. However, after loading is complete, the system 100 can operate at intervals (for example, by processing images once every 3 seconds) to conserve power, data storage and bandwidth while meeting the requirements of the specific application.

Augmented Package Loading Techniques

Package tracking systems described herein can track packages within conventional delivery systems wherein loaders place packages on vehicles according to their perception of proper loading protocols. This perception may vary by loader, region, delivery vehicle, or other factors. Such package tracking systems can also be configured to optimize package loading in addition to delivery. In one example, the central server 204 (FIG. 2) or image processor CPU 122 (FIG. 1) may keep a list of all packages intended for placement on a particular delivery vehicle. In this example, the package identification information for each package includes the intended addressee and package size information. The intended addressees are used to generate an order of delivery that may be used to place packages in a specific order in the delivery vehicle (e.g., packages to be delivered first are put in a position of easiest access). Package size may also be a factor affecting package loading. Heavy or large packages can be located on the floor or an appropriate (i.e., low) shelf, irrespective of the delivery order.

In one embodiment, when the loader scans a package and enters the delivery vehicle with the package, the CPU 122 activates a light that shines on the location for that package. The location and matching of the package may be confirmed as previously described. A focused light may be used to identify the proper loading place for the package. The source of the light can be the same light as that used to identify a package for a driver.

In the various embodiments detailed herein, the location of a package may be "marked" or indicated in a variety of manners: by projecting light on the package of interest (unidentified package, package to be delivered, etc.), by projecting light where the package is to be loaded, by marking the position of the package on a live camera feed of the cargo bay, in a representational view of the cargo bay with the package location identified, or in a projection of the marking in augmented reality glasses.

As an example of light-based guidance for package loading, consider a system that employs conveyor belts to move packages inside a facility. As the packages are transported on the conveyor belt they are scanned for identification, either by optical, magnetic, or electromagnetic means. After each package is identified, the system continually monitors the position of the package as it moves from one area of the facility to the end destination for transportation vehicle loading. As packages reach areas for vehicle loading, the system uses a form of light guidance to help loaders identify proper vehicle package assignment. For example, if a package is assigned to particular truck, that truck could be assigned a particular color, say blue. The package designated for the blue truck is then illuminated with a blue light, through LED, laser, or related light guidance means, thus making package vehicle identification easy for loaders. After the loader places the package in the identified delivery truck, the package tracking system can detect its presence and register its location as previously described.

One of ordinary skill in the art will recognize that other cues (visual, auditory or the like) using various technologies may be used to mark package location for easy loading, delivery or tracking of packages.

Augmented Tracking

Various embodiments of the package tracking systems described herein may benefit from additional tracking technology. For example, in the bigger areas (e.g., freight, air cargo, large shipping containers), one may incorporate other techniques to make tracking more interactive, such as Ultra-wideband (UWB) or Wireless Lan (including, but not limited to, 802.11 protocol communications or the like). Example implementations of techniques for tracking can be found in U.S. patent application Ser. No. 14/614,734, filed Feb. 5, 2015, titled "Virtual Reality and Augmented Reality Functionality for Mobile Devices," the entirety of which is hereby incorporated by reference.

In a package tracking system that augments optical tracking with UWB tracking, the driver, the driver's tablet, the packages, or all of the above, are actively tracked as described in U.S. patent application Ser. No. 15/041,405, filed Feb. 11, 2016, titled "Accurate Geographic Tracking of Mobile Devices," the entirety of which is incorporated by reference herein. In one embodiment, the position of the driver's tablet is tracked so that the viewpoint from the tablet's camera associated with the tablet location and orientation is streamed to the tablet, with digital images overlaid onto the tablet's camera view, and is used for navigation or package identification. In this example, as the tablet camera views a stack of packages, the accurate tracking of the physical position and orientation of the tablet allows the system to overlay a digital image, for example, a flashing red light, on top of the package that is seen by the tablet camera. In this case, digital images are shown on the tablet camera view, not projected onto the actual package by an external light source.

Small delivery (and other delivery modes, like airfreight, cargo containers) may use of UWB or RF (radio frequency) to improve positional accuracy tracking for when and where packages are scanned. The packages may be tracked using UWB with tags on the packages until a handoff to the camera for optically tracking inside the delivery vehicle becomes possible. This is a benefit as it reduces or eliminates the need to do optical image processing in the delivery vehicle, but still provides package ID confirmation and tracking (which may then also be re-registered via dimension data inside the delivery vehicle by the cameras).

In addition, cumulative tracking methods (i.e., optics and UWB) help track the driver and packages. For example, in dark environments, large environments or in situations involving other issues with optical coverage, it may be preferable to use UWB or related RF-based tracking to identify initial package location, and to switch to optical scanning after package location is generally identified. In such situations, UWB tracking may augment or supplant optical tracking.

Also, in some situations, one may want to track the loader using a tag physically associated with that person. In such an environment, one may scan a package and then track the loader using UWB to make sure the package goes to the correct delivery vehicle (for instance, they may be loading multiple trucks) or, in other use cases, track the driver as the driver leaves the delivery vehicle to insure proper delivery drop off location. In the scenario where a driver is being tracked, the driver is tracked as he leaves the delivery vehicle with the GPS position known either on the delivery vehicle or on the driver. As the driver leaves the delivery vehicle, the driver is tracked and when the package is dropped off, the package is scanned and the position in relation to the delivery vehicle is recorded to show proof of delivery. As described in the aforementioned U.S. patent application Ser. No. 15/041,405, augmented reality (AR) glasses can be used to track a driver. In this scenario, the AR glasses are being tracked by a form of RF tracking, and the orientation and position of the driver may be determined by the glasses.

Example implementations of UWB or other wireless tracking systems are described disclosed in U.S. patent application Ser. No. 13/975,724, filed Aug. 26, 2013, titled "Radio Frequency Communication System", the entirety of which is incorporated by reference herein. Tracking may be implemented outside the delivery to confirm that a package that was scanned by glasses or a finger scanner is the same package that gets loaded into the delivery vehicle. In such scenarios, a loader scans the package off a conveyor belt, and the loader is tracked by the UWB system to ensure that the package scanned is the package placed in the truck or is at the proper loading area of the delivery vehicle. Thereafter, the optical tracking system tracks packages within the area of coverage.

Figure 7:
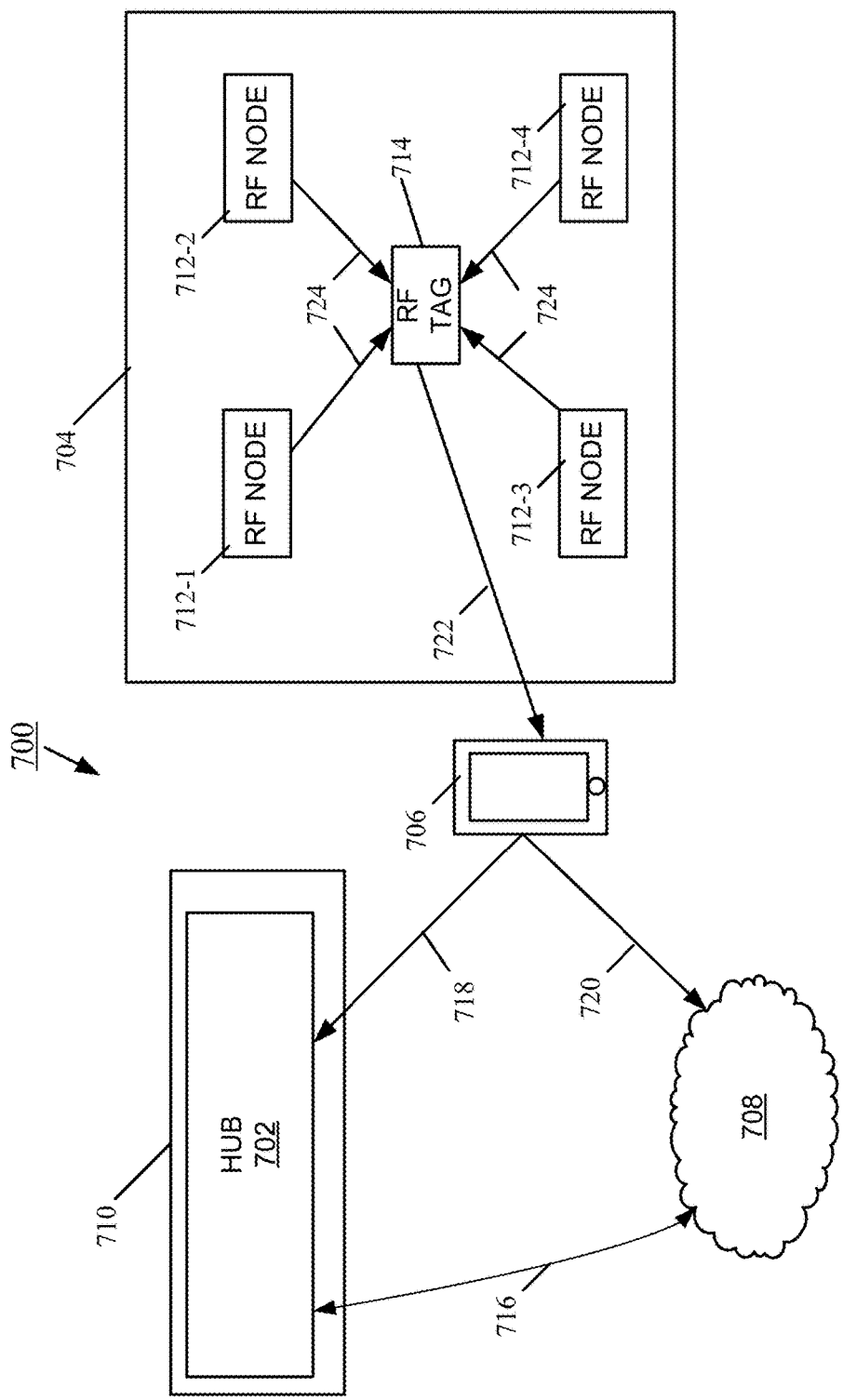
FIG. 7 is a diagram of embodiments of a package tracking system that uses radio frequency position determinations in conjunction with optical tracking.

FIG. 7 shows a diagram of an embodiment of a package tracking system 700 including an optical tracking hub 702 augmented with a radio frequency (RF) positioning system 704. The package tracking system 700 includes a user device 706 and a cloud-based central server system 708. The hub 702 is deployed in an area 710 used to hold packages, assets, objects, items, or the like, and is in communication with the cloud-based central server system 708 over a wireless communications channel (e.g., cellular) 716. Depending on the service provider for cellular PHY communications, if the holding area (e.g., delivery truck) is outside of the service area, the hub 702 buffers the data, package identification information, transactions, etc., until the holding area comes into range of a facility with secure Wi-Fi (i.e., provided, for example, by the package delivery company). For purposes of enabling customers to push or pull data from the cloud-based central server system 708, the hub provides a "Cloud" API (application program interface).

The RF positioning system 704 includes four RF nodes 712-1, 712-2, 712-3, and 712-4 (generally, 712) and an RF tag 714. The RF positioning system 704 operates to track the position of the RF tag 714, which can be affixed to the package or worn by personnel, such as a driver or package loader. In general, the RF nodes 712 provide an interface over Wi-Fi to the user device 706. The RF nodes 712 are in communication with the user device 706 via Wi-Fi, and the user device 706 is in communication with the hub 702 via Wi-Fi; in effect, the hub 702 provides an ad hoc Wi-Fi hotspot to the user device 706 and RF nodes 712.

The user device 706 is any computing device capable of running applications and wireless communications. Examples of the user device 706 include, but are not limited to, tablets and smart phones. The user device 706 can be in communication with the hub 702 over a wireless communications link 718, with the server system 708 over a wireless communications link 720, or both. An example implementation of the communication links 718, 720 is Wi-Fi.

The area 710 for holding assets can be stationary or mobile. A stationary holding area can be disposed anywhere along the delivery chain, from a warehouse to a package delivery center. Examples of stationary holding areas include, but are not limited to, package rooms, closets, warehouses, inventory rooms, storage rooms, and trailers. Examples of mobile holding areas include, but are not limited to, delivery trucks, tractor trailers, railway cars, shipping containers, and airplane cargo bays. Each holding area (i.e., each facility, truck, etc.) is equipped with an optical tracking hub 702. An example of a delivery truck than can be equipped with an optical tracking hub 702 is the standard Ford® P1000.

The RF tag 714 is in communication with the user device 706 over a wireless communication link 722, for example, Bluetooth, and with the RF nodes 712 by way of RF signals 724.

During operation, in general the hub 702 provides interior tracking (e.g., inside a delivery vehicle) of a package using optical techniques and the RF positioning system 704 provides exterior tracking (e.g., outside of the delivery vehicle) of the RF tag 714 using RF signals. In one embodiment, the user device 706 directly communicates with the server system 708 (e.g., in the cloud). In another embodiment, the user device 706 provides data to the hub 702, and the hub 702 communicates with the server system 708. In this embodiment, any feedback information from the server system 708 goes through the hub 702, which communicates such information to the user device 706 by Wi-Fi.

Figure 8:
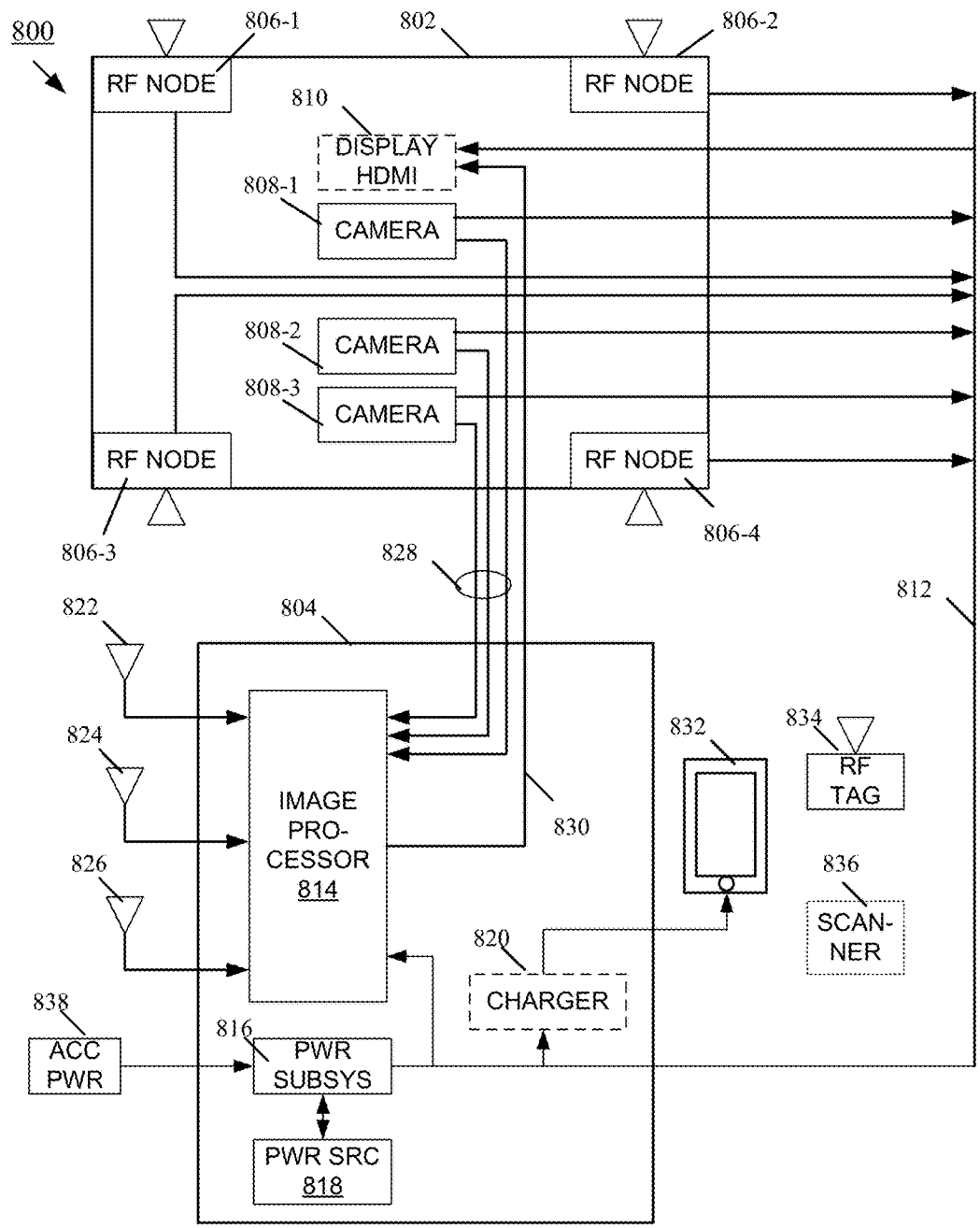
FIG. 8 is a schematic for an embodiment of a package tracking system.

FIG. 8 is a schematic for an embodiment of a package tracking system 800 including a holding area 802, configured for optical tracking and augmented with RF tracking, in communication with a hub and power subsystem 804. The holding area 802 includes four RF nodes 806-1, 806-2, 806-3, 806-4 (generally, 806) with antennae, three cameras (with depth sensors) 808-1, 808-2, 808-3 (generally, 808), and an optional monitor or display device 810 (e.g., an HDMI video display, with or without a speaker) to provide a visual status of the system 800. In one embodiment, the three cameras 808 are USB3-based. Each RF node 806, camera 808, and display device 810 is connected to a power bus 812 (e.g., a 12 VDC). The holding area 802 can also include a light projector (not shown) to shine focused light, or a particular color light, on the location within the area, to show personnel where a particular package can be currently found or where a particular package being loaded should be placed.

The hub and power subsystem 804 includes an image processor 814, a power subsystem 816 connected to a power source 818, and an optional charger 820. The power subsystem 816 provides power to the image processor 814 and charger 820 by the power bus 814. In one embodiment, the power source 818 is a battery (e.g., 12 VDC, 55 aH). An accessory power source 838 is connected to the power subsystem 816. In communication with the image processor 814 is a cellular antenna 822, a GPS antenna 824 and a Wi-Fi antenna 826. The image processor 814 is also in communication with the cameras 808 by communication links 828 and with the optional display device 810 by communication link 830. Also shown are the user device 832, RF tag 834, and scanner 836. An optional light projector external to the holding area 802 (not shown) can be used to shine light on a package before the package is loaded, for purposes of guiding a loader to the location where the package is to be loaded (e.g., a particular delivery truck).

In one embodiment, the image processor 814 is implemented with a bCOM6-L1400 Express Module produced by General Electric of Fairfield, Conn. The interfaces of the image processor 814 include: at least three USB3 ports for connecting to the cameras 808 and a USB2 port for connecting to an optional light-projector gimbal; an HDMI port for connecting to the display device 810; an integral GPS unit with the external GPS antenna; a cellular PHY card/interface (e.g., LTE, GSM, UMTS, CDMA or WCDMA, or WiMAX) with a cellular antenna jack (for an appropriate multiband cellular antenna operating at 800-950 MHz, 1800-1900, 1900-2000, 2100-2200 MHz bands, and can be a different physical antenna depending on the cellular PHY provider chosen for the given area) to enable a wireless connection to a cellular data service provider; and a Wi-Fi module with a Wi-Fi antenna jack (the antenna is omnidirectional, providing 500 m of range, and operating over the 2400-2480 MHz range).

The holding area 802 can be stationary or mobile. For a mobile holding area 802, such as a delivery truck, the RF nodes 806 can be mounted externally on the roof of the cargo area at the four corners, with the cameras 808 and display device 810 mounted internally within the holding area 802. All of the cameras 808 are mounted near the ceiling of the truck box, facing towards the back of the truck, one camera at each front corner of the truck box, with the third camera at the front of the truck box disposed between the other two cameras. The cellular antenna 822 and Wi-Fi antenna 826 are mounted inside the truck and the GPS antenna 824 is mounted on the roof. In addition, a standard small form factor 2-axis gimbal can be mounted to the ceiling or rafter of the truck box. The gimbal provides azimuth (180 degree) and elevation angle (90 degree) positioning of the optional interior light projector (e.g., a laser pointer), which can be turned on and off. A USB2 interface of the image processor to a light projector sets the azimuth, elevation, and on/off state of the light.

The hub and power subsystem 804 can be placed within the cab of the truck, for example, behind the driver's seat. The system 800 is not attached directly to the vehicle DC power terminals, or directly to the battery of the vehicle, to avoid draining the battery of the delivery vehicle. Power subsystem 818 can connect to the accessory power 838 of the vehicle on a fuse. When the delivery vehicle is parked and off, the accessory power 838 is turned off, and the system 800 runs on the internal battery 818. The battery 818 thus ensures that when the delivery vehicle is off (such as during package loading) the various components of the system 800 remain powered. When the vehicle is idling or in motion, the system 800 charges the battery 818. The power subsystem 818 also provides 12 VDC and 5 VDC dedicated for the RF Nodes 806 and the cameras 808.

For a stationary holding area 802, the RF nodes 806 can be mounted externally near an entrance to the area 802, with the cameras 808 and display device 810 installed inside. The hub and power subsystem 804 can also be installed inside or outside of the holding area 802. For a stationary holding area 802, the cellular antenna 822 and GPS antenna 824 are optional.

A schematic diagram, as shown in FIG. 8, without the RF nodes 806 and RF tag 834, can illustrate an embodiment of a package tracking system that is not augmented with RF tracking.

Figure 9:
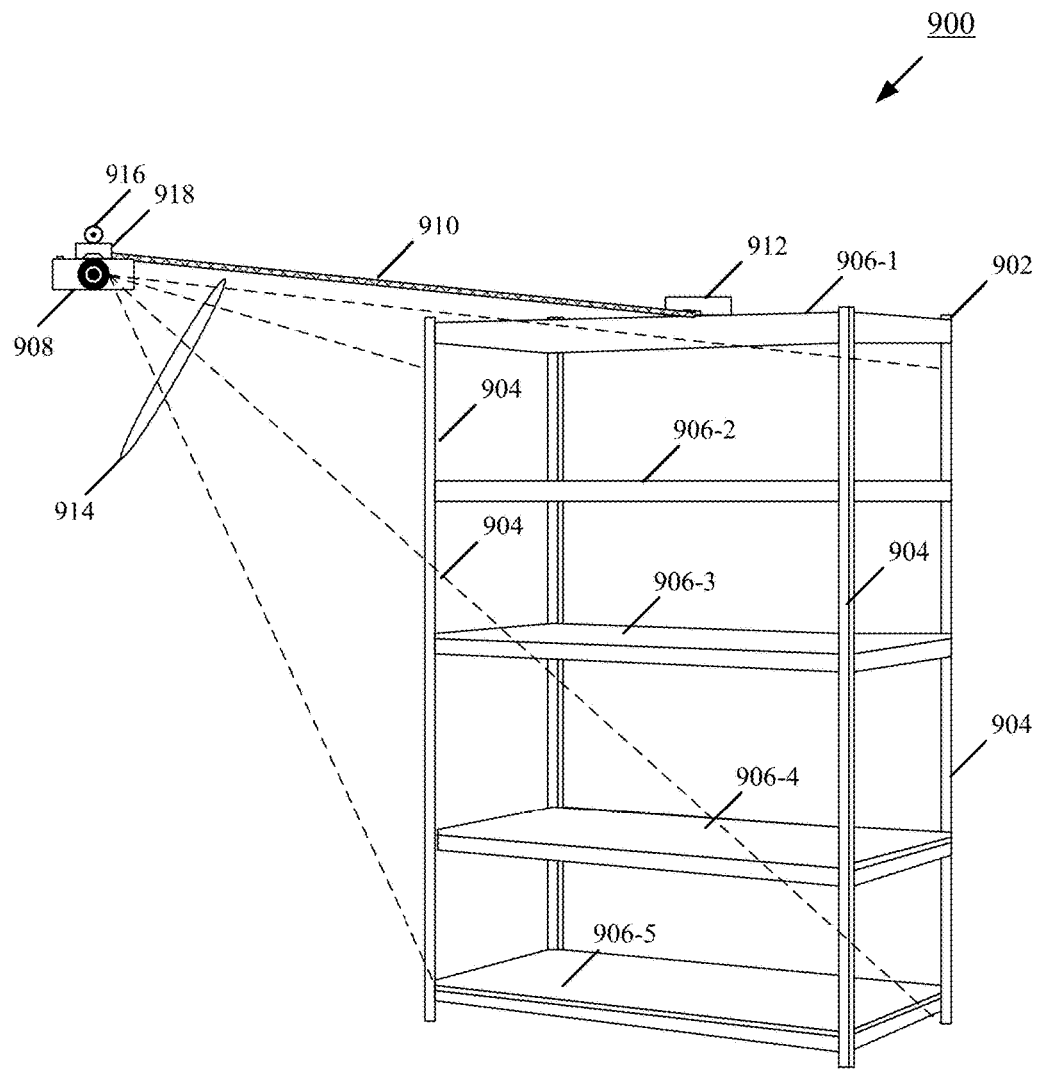
FIG. 9 is a view of an embodiment of a modular shelving system configured for package tracking.

FIG. 9 shows an embodiment of a modular shelving system 900 configured for package tracking. The shelving system 900 includes a rectangular frame 902 made of four uprights posts 904 that support shelves 906-1, 906-2, 906-3, 906-4, 906-5 (generally, 906), shelf 906-1 being a top panel and shelf 906-5 being a bottom panel. The frame 902 may include side panels. The shelves 906 may include bin dividers that partition the shelf into compartments. The frame 902 and shelves 906 described are for illustration purposes only; the principles of package tracking described herein can be applied broadly to any kind of horizontal surface, and are not to be limited to a particular kind of shelving structure.

The shelving system 900 further includes an optical system comprised of a camera 908 (broadly, an optical sensor), an arm 910, and a controller 912. In this embodiment, the arm 910 provides just one example of an apparatus for positioning the camera 908 such that its field of view closely encompasses the shelves 906. Other apparatus, such as brackets and the like can suffice for this purpose. In addition, the camera 908 does not need to be connected to the frames or shelves 906. For example, the camera 908 can be mounted on an opposing wall or hung from the ceiling or a rafter.

In this embodiment, the arm 910 extends along the top panel 906-1 and projects over the front side of the shelves 906. The camera 908 is fixed to one end of the arm 910 and faces the shelves 906. The arm 910 is rigidly fixed to the frame 902 and designed to firmly support the weight of the camera 908 (laser pointer 916 and gimbal 918). (The arm 910 may have hinges so that it may fold, or be extendible, to allow for compact packaging.)

The extent of the overlap of the arm 910 beyond the front edge of the top panel 906-1 is fixed so that the camera's field of the view 914 closely covers the shelves upon which packages are expected to be placed (in this example, shelves 906-2, 906-3, 906-4, and 906-5). This distance limits the camera's field of view 914 to the shelves 906 of this shelving system 900. In this sense, the camera 908 is dedicated to capturing images, and thus for tracking packages, on this shelving system 900 only, although other shelving systems may be disposed adjacently. The camera 908 can be like camera 118 in form, fit, and function, previously described in connection with FIG. 1.

The camera 908 is in communication with the controller 912 by way of a wired or wireless path. The controller 912 includes an image-processing CPU (not shown), which can have the same form, fit, and function as the image-processing CPU 122 of FIG. 1, except the image-processing CPU of the controller 912 does not stitch images when image processing because it receives images only from the single camera 908 with its fixed field of view 914. In this sense, the controller 912 is dedicated to image-processing for, and thus for tracking packages on, this shelving system 900 only, although other shelving systems with their own cameras may be disposed adjacently.

The shelving system 900 can also include a laser pointer 916 fixed to a gimbal 918. The gimbal 918 (and mounted laser pointer 916) may be mounted to the camera 908 or mounted elsewhere, separate from the camera 908, provided the laser pointer 916 can focus its light at each of the shelves 906 in the desired view area (the desired view area—or area of interest—can be a subset of the entire shelving area, such as a particular package). The laser pointer 916 and gimbal 918 are like those described previously in connection with the FIG. 8. The light of the laser pointer 916 can serve to direct personnel interested to a particular location or package on the shelves 906. Like the camera 908 and controller 912, the laser pointer 916 is dedicated to use in tracking packages on the shelving system 900 only, although other shelving systems may be disposed nearby. Weight sensors (not shown) can also be included in the shelving system 900, for measuring weight on the shelves 906 and facilitating, among other things, the confirmation of proper package placement and removal, as described in the aforementioned U.S. patent application Ser. No. 15/259,474, filed Sep. 8, 2016.

Optionally, the shelving system 900 can include a display (e.g., display 810 in FIG. 8), used by the controller 912 to produce a pre-determined map or layout of the shelves 906, overlaid with images of packages at their registered locations. The display can show a user the extent of the field of view 914 of the camera 908, by which the user can confirm whether the camera 908 has been positioned properly in front of the shelves 906, thus facilitating the making of adjustments to the camera's placement so that the field of view closely encompasses the targeted tracking area.

The shelving system 900 can be made of metal, wood, or plastic, or any combination thereof. In general, shelving systems can be packaged, sold, and distributed as kits. An example of one such kit comprises the camera 908 and the controller 912. Guidelines for positioning the camera so that its field of view closely covers the targeted tracking area can be provided by a variety of means (e.g., online or printed instruction manuals). Other examples of kits further include an apparatus for fixing the camera 908 in its position (e.g., an arm, a bracket), weight sensors, the laser pointer 916 and gimbal 918, a display screen or monitor, or any combination thereof. Still other examples of kits can include the particular kind of shelving (e.g., frame 902, posts 904, shelves 906) used for the package tracking system.

Figure 10:
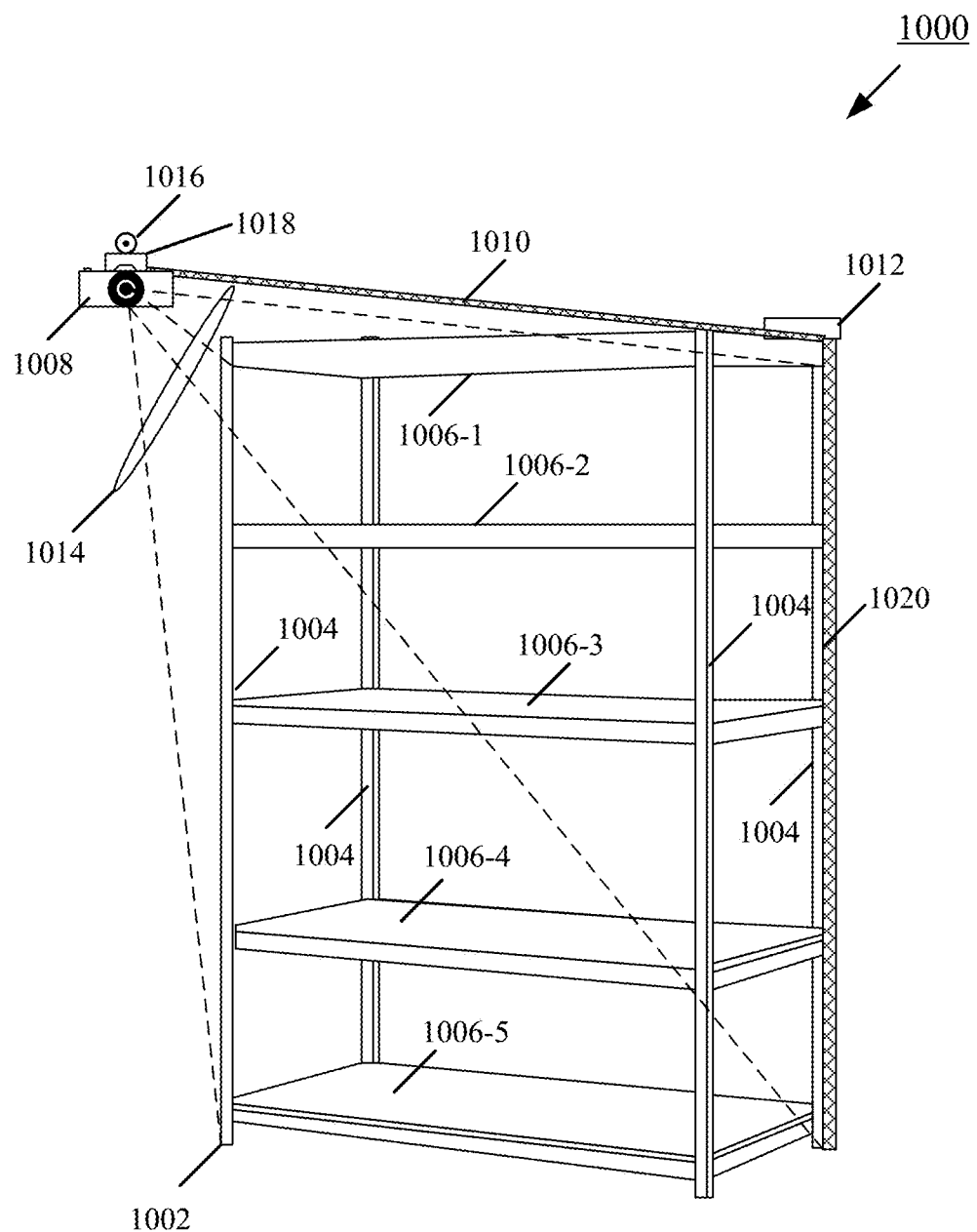
FIG. 10 is a view of another embodiment of a modular shelving system configured for package tracking.

FIG. 10 shows another embodiment of a modular shelving system 1000 configured for package tracking. The shelving system 1000 includes a rectangular frame 1002 similar to the frame 902 of FIG. 9, with four uprights posts 1004 that support shelves 1006-1, 1006-2, 1006-3, 1006-4, 1006-5 (generally, 1006), shelf 1006-1 being a top panel and shelf 1006-5 being a bottom panel. The shelving system 1000 further includes an optical system comprised of a camera 1008 (broadly, an optical sensor), an arm 1010, a controller 1012, and a post 1020. In this embodiment, the arm 1010 and post 1020 illustrate just one of many different ways for positioning the camera 1008 such that its field of view closely encompasses the shelves 1006. As previously described, other mounting apparatus, such as brackets and the like, can suffice for this purpose. Further, the camera 1008 does not need to be connected to the frames or shelves. For example, the camera can be mounted on an opposite wall or hung from the ceiling or a rafter.

The arm 1010 extends generally perpendicularly from a top end of the post 1020, alongside the top panel 1006-1, and projects over the front side of the shelves 1006. Alternatively, the arm 1010 can extend perpendicularly from a region of the post 1020 that is between the height of the top panel 1006-1 and the bottom panel 1006-5. As another alternative configuration, the arm 1010 can angle from the post 1020 such that the arm 1010 extends atop the top panel 1006-1.

In each of the alternative configurations, the camera 1008 is fixed to one end of the arm 1010 such that the camera 1008 faces the shelves 1006, with a field of view 1014 closely encompassing the area of the shelves 1006. The features (e.g., the optional gimbal 1018, laser pointer 1016, and display monitor) and functionality of the shelving system 1000 are the same as the corresponding features and functionality of the shelving system 900 described in connection with FIG. 9. Like the shelving system 900, the shelving system 1000 can also be marketed, sold, and distributed a single kits (e.g., the camera and controller with or without mounting apparatus, with or without shelving, and with or without optional components, namely weight sensors, the gimbal, laser pointer, and display monitor).

Figure 11:
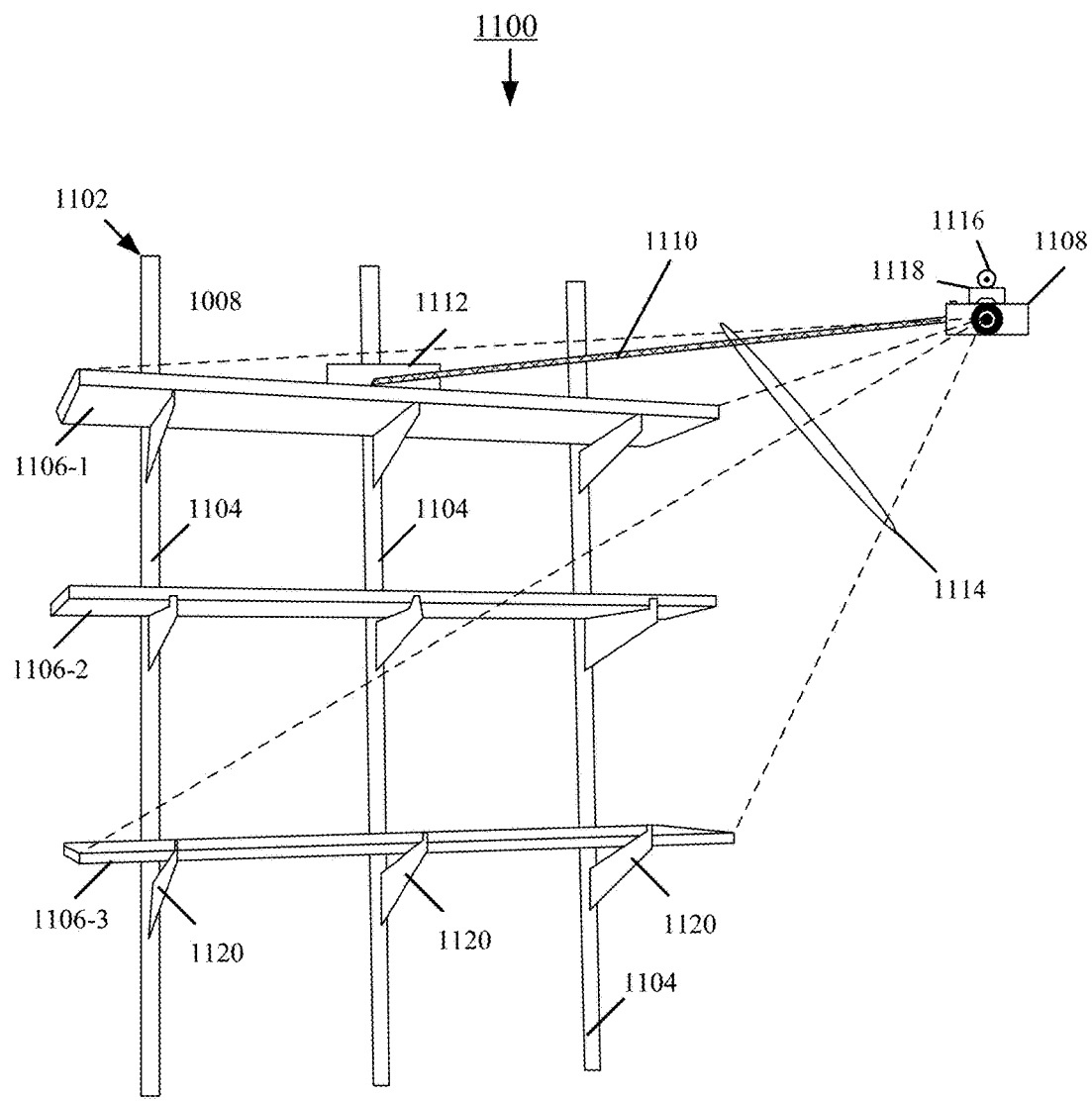
FIG. 11 is a view of yet another embodiment of a modular shelving system configured for package tracking.

FIG. 11 shows an embodiment of a modular shelving system 1100 configured for package tracking. This embodiment serves to illustrate one of innumerable variety of forms the shelving can have in the practice of the principles described herein. The shelving system 1100 includes a frame 1102 comprised of three uprights 1104 and brackets 1120 that support shelves 1106-1, 1106-2, 1106-3, (generally, 1106), shelf 1106-1 being a top shelf and shelf 1106-3 being a bottom shelf Like the aforementioned modular shelving systems 900 and 1000, this shelving system 1100 has a camera 1108, an arm 1110, and a controller 1112. The arm 1110 is fixed to one of the uprights 1114, extends along the top shelf 1106-1, and projects over the front side of the shelves 1106. Fixed to one end of the arm 1110, the camera 1108 faces the shelves 1106. The extent of overlap of the arm 1110 beyond the front edge of the top shelf 1106-1 is fixed so that the camera's field of the view 1114 closely covers the shelves 1106 upon which packages are expected to be placed. The camera 1108 is in communication with a controller 1112 by way of a wired or wireless connection. The controller 1112 includes an image-processing CPU (not shown), similar to those previously described. The camera 1108 and controller 1112 (and optional laser pointer 1116, gimbal 1118, and display monitor) are dedicated for use in tracking packages on this particular shelving system 1100, although other shelving systems may be disposed nearby.

The features (e.g., the optional gimbal 1118, laser pointer 1116, and display monitor) and functionality of the shelving system 1100 are the same as the corresponding features and functionality of the shelving system 900 described in connection with FIG. 9. Like the shelving system 900, the shelving system 1100 can also be marketed, sold, and distributed a single kits (e.g., the camera and controller with or without mounting apparatus, with or without shelving, and with or without optional components, namely the weight sensors, gimbal, laser pointer, and display monitor).

Figure 12:
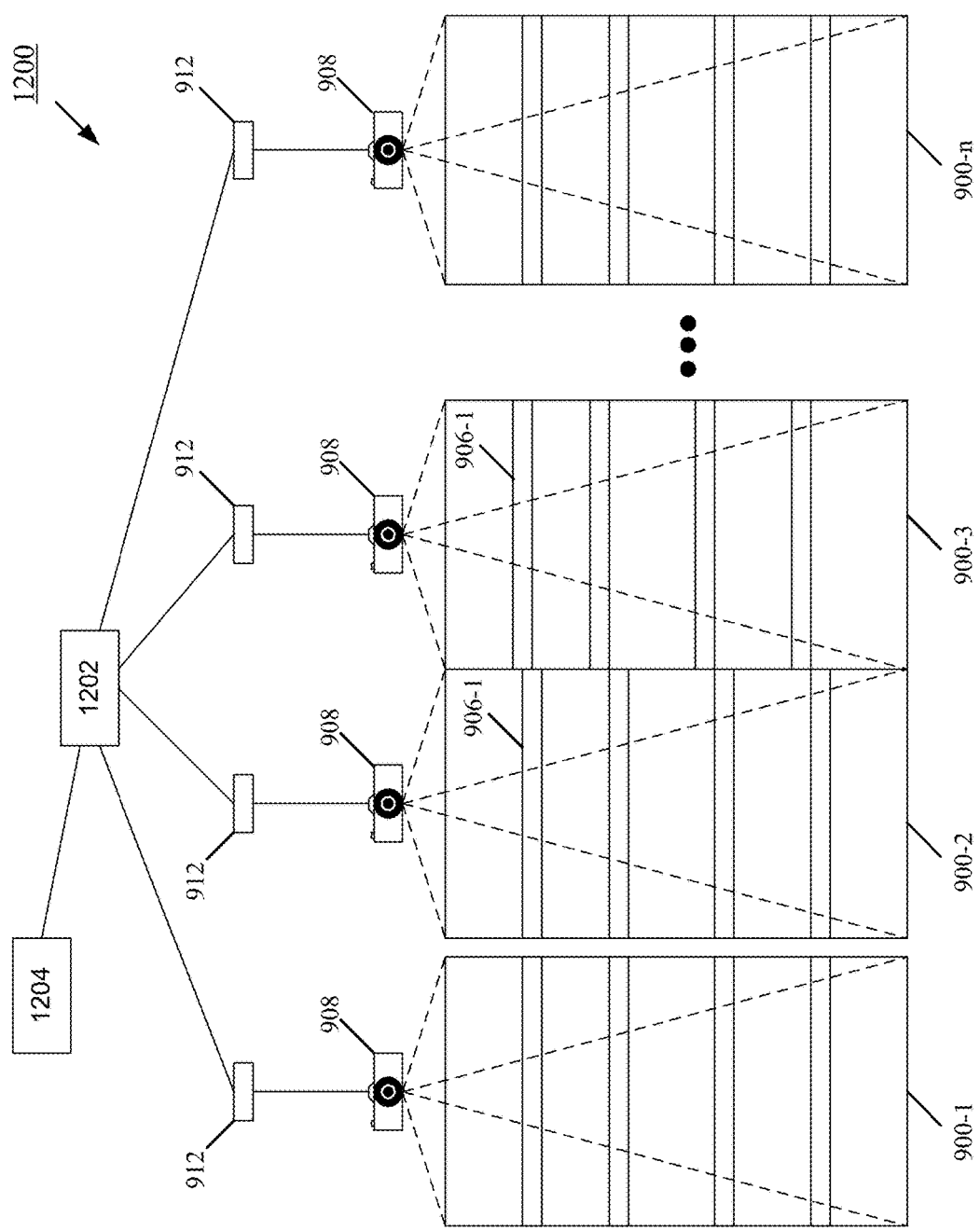
FIG. 12 is a diagram of a package tracking system with a plurality of modular shelving systems.

FIG. 12 shows an embodiment of a package tracking system 1200 having a plurality of modular shelving systems 900-1, 900-2, 900-3, 900-n (generally, 900) disposed adjacent to each other within a package tracking area, such as a room, cargo bay of a delivery vehicle, an open wall in a room, or a warehouse. Each modular shelving system 900 includes shelving (frames plus shelves), a camera 908 facing the shelves and in communication with a controller 912. Each of the controllers 912 can be in communication with a master controller 1202 via a wired or wireless communication path. The heights of the shelves of neighboring shelving systems (e.g., 900-2, 900-3) can be at staggered to discourage sliding a package from one shelving system to an adjacent shelving system.

During operation, each controller 912 can process images produced by its corresponding camera 908 and track packages placed and removed on its corresponding shelves. The master controller 1202 can receive images from each of the modular shelving systems 900 and produce a composite view of the package tracking area, for display on a monitor 1204. Alternatively, the master controller 1202 can cyclically and sequentially display each of the views produced by the modular shelving systems 900.

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. A reference to a particular embodiment within the specification do not necessarily all refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. A shelving system comprising:
   at least one shelf;
   a camera fixed at a distance from the at least one shelf such that a field of view of the camera faces the at least one shelf and closely encompasses the at least one shelf;
   a light source adapted to project a focused beacon of light at the at least one shelf;
   a gimbal physically coupled to the light source, a positioning of the gimbal determining a direction in which the light source projects the beam of light; and
   a controller in communication with the camera and with the gimbal, the controller having a processor adapted to receive images captured by the camera within the camera's field of view and to determine from the images whether a particular object has been placed on, moved, or removed from the at least one shelf, the controller being configured to adjust the positioning of the gimbal to shine the beam of light at any location on the at least one shelf within the field of view of the camera.

2. The shelving system of claim 1, further comprising an apparatus for mounting the camera at the distance from the at least one shelf such that a field of view of the camera faces and closely encompasses the at least one shelf.

3. The shelving system of claim 2, wherein the apparatus for mounting the camera comprises an arm coupled to a member supporting or connected to the at least one shelf.

4. The shelving system of claim 3, wherein the arm extends from a shelf of the at least one shelf or from a member supporting or connected to the at least one shelf, and holds the camera for a view of the at least one shelf.

5. The shelving system of claim 1, wherein the camera is in wireless communication with the controller for transmitting images thereto.

6. The shelving system of claim 1, wherein the gimbal and light source are mounted to the camera.

7. The shelving system of claim 1, wherein the light source is in wireless communication with the controller to receive positioning commands therefrom.

8. A shelving system kit comprising:
   a camera configured for mounting at a distance from at least one shelf such that a field of view of the camera faces the at least one shelf and closely encompasses the at least one shelf;
   a light source adapted to project a focused beam of light; and
   a controller adapted to communicate with the camera and with the light source, the controller having a processor adapted to receive images captured by the camera within the camera's field of view and to determine from the images whether a particular object has been placed on, moved, or removed from the at least one shelf, the controller being configured to shine the beam of light on any location on the at least one shelf within the field of view of the camera by manipulating the light source.

9. The shelving system kit of claim 8, further comprising an apparatus for mounting the camera at the distance from the at least one shelf such that a field of view of the camera faces the at least one shelf and closely encompasses the at least one shelf.

10. The shelving system kit of claim 9, wherein the apparatus for mounting the camera comprises an arm adapted to couple to a member supporting or connected to the at least one shelf.

11. The shelving system kit of claim 8, wherein the camera is configured for wireless communication with the controller for transmitting images thereto.

12. The shelving system kit of claim 8, further comprising:
   a gimbal adapted for physically coupling to the light source, wherein controller is configured to determine a direction of the beam of light by adjusting the gimbal as determined by the controller.

13. The shelving system kit of claim 12, wherein the gimbal and light source are adapted for mounting to the camera.

14. The shelving system kit of claim 12, wherein the light source is configured for wireless communication with the controller to receive positioning commands therefrom.

15. The shelving system kit of claim 8, further comprising the at least one shelf.

16. A package tracking system comprising:
   a plurality of shelving systems disposed in a package tracking area, each shelving system including:
      at least one shelf;
      a camera fixed at a distance from the at least one shelf such that a field of view of the camera faces the at least one shelf and closely encompasses the at least one shelf;
      a light source adapted to project a focused beam of light;
      a gimbal physically coupled to the light source, a positioning of the gimbal determining a direction in which the light source projects the beam of light; and
      a controller in communication with the camera, the controller having a processor adapted to receive images captured by the camera within the camera's field of view and to determine from the images whether a particular object has been placed on, moved, or removed from the at least one shelf, the controller being configured to adjust the positioning of the gimbal to shine the beam of light on any location on the at least one shelf within the field of view of the camera; and
   a master controller in communication with each controller of the plurality of shelving systems.

17. The package tracking system of claim 16, wherein the package tracking area is one of a room, an open wall of a room, a cargo bay of a delivery vehicle or plane, a storeroom, or a warehouse.

18. The package tracking system of claim 16, wherein each shelving system further comprises an apparatus for mounting the camera of that shelving system at the distance from the at least one shelf of that shelving system such that a field of view of the camera of that shelving system faces and closely encompasses the at least one shelf of that shelving system.

19. The package tracking system of claim 16, wherein the light source of each shelving system comprises: a light projector facing the at least one shelf with a projection area that covers all shelving area and shines focused light only on shelving area of interest, as determined by the controller of that shelving system.

20. The shelving system of claim 1, wherein the light source is interior to the gimbal.

21. The shelving system of claim 1, wherein the controller is further configured to guide handling of the particular object with respect to the at least one shelf by adjusting the positioning of the gimbal and manipulating operation of the light source.

22. The shelving system kit of claim 8, wherein the controller is further configured to guide handling of the particular object with respect to the at least one shelf by manipulating operation of the light source.

* * * * *

UNITED STATES PATENT AND TRADEMARK OFFICE
CERTIFICATE OF CORRECTION

| | |
|---|---|
| PATENT NO. | : 10,148,918 B1 |
| APPLICATION NO. | : 15/270749 |
| DATED | : September 20, 2016 |
| INVENTOR(S) | : Alex Seiger, Shahzad Farooq Kirmani and Edward L. Hill |

Page 1 of 1

It is certified that error appears in the above-identified patent and that said Letters Patent is hereby corrected as shown below:

In the Claims

Column 27, Line 4 (Claim 2 Line 4), please change "wherein controller" to --wherein the controller--

Signed and Sealed this
Sixteenth Day of July, 2019

Andrei Iancu
*Director of the United States Patent and Trademark Office*